US012454589B2

(12) United States Patent
Sandkuehler et al.

(10) Patent No.: US 12,454,589 B2
(45) Date of Patent: Oct. 28, 2025

(54) POLYETHYLENE COMPOSITIONS AND FILMS INCLUDING POLYETHYLENE COMPOSITIONS

(71) Applicant: Dow Global Technologies LLC, Midland, MI (US)

(72) Inventors: Peter Hermann Roland Sandkuehler, Horgen (CH); Sanjib Biswas, Lake Jackson, TX (US); David T. Gillespie, Pearland, TX (US); Mehmet Demirors, Pearland, TX (US); Michael J. Zogg, Jr., Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 547 days.

(21) Appl. No.: 18/003,599

(22) PCT Filed: Feb. 5, 2021

(86) PCT No.: PCT/US2021/016815
§ 371 (c)(1),
(2) Date: Dec. 28, 2022

(87) PCT Pub. No.: WO2022/005533
PCT Pub. Date: Jan. 6, 2022

(65) Prior Publication Data
US 2023/0312787 A1    Oct. 5, 2023

Related U.S. Application Data

(60) Provisional application No. 63/046,386, filed on Jun. 30, 2020.

(51) Int. Cl.
C08F 210/16    (2006.01)
C08F 2/00      (2006.01)
(Continued)

(52) U.S. Cl.
CPC ............ *C08F 210/16* (2013.01); *C08F 2/001* (2013.01); *C08F 2/01* (2013.01); *C08J 5/18* (2013.01); *C08J 2323/08* (2013.01)

(58) Field of Classification Search
CPC ... C08F 210/16; C08F 2/00; C08F 2/01; C08J 5/18; C08J 2323/08
See application file for complete search history.

(56) References Cited

U.S. PATENT DOCUMENTS 3,645,992 A    2/1972  Elston
3,914,342 A    10/1975 Mitchell
(Continued)

FOREIGN PATENT DOCUMENTS

JP    2010518225 A    6/2015
JP    2015520276 A    7/2015
(Continued)

OTHER PUBLICATIONS

Brazil Technical Report dated Aug. 28, 2024, pertaining to BR Patent Application No. BR112022026666-9, 10 pgs.
(Continued)

*Primary Examiner* — Shane Fang
(74) *Attorney, Agent, or Firm* — Dinsmore & Shohl LLP

(57) ABSTRACT

Polyethylene compositions are disclosed that may have a density of 0.910 g/cm³ to 0.924 g/cm³ and a melt index ($I_2$) In of 0.1 g/10 minutes to 0.5 g/10 minutes and include a first polyethylene fraction area in the temperature range from 45° C. to 80° C. of an elution profile via improved comonomer composition distribution (iCCD) analysis method; a second polyethylene fraction area in the temperature range from 80° C. to 95° C. of the elution profile, and a third polyethylene fraction area in the temperature range from 95° C. to 110° C. of the elution profile. The second polyethylene fraction area may include at least 5% of the total area of the elution (Continued)

profile. The third polyethylene fraction area may include at least 25% of the total area of the elution profile. A ratio of the first polyethylene fraction area to the second polyethylene fraction area may be from 6 to 15.

19 Claims, 2 Drawing Sheets

(51) Int. Cl.
    *C08F 2/01*         (2006.01)
    *C08J 5/18*         (2006.01)

(56) References Cited

U.S. PATENT DOCUMENTS

| | | | |
|---|---|---|---|
| 4,076,698 A | 2/1978 | Anderson et al. | |
| 4,599,392 A | 7/1986 | McKinney et al. | |
| 5,272,236 A | 12/1993 | Lai et al. | |
| 5,278,272 A | 1/1994 | Lai et al. | |
| 5,582,923 A | 12/1996 | Kale et al. | |
| 5,733,155 A | 3/1998 | Sagawa | |
| 5,854,045 A | 12/1998 | Fang et al. | |
| 9,688,795 B2 | 6/2017 | Cerk et al. | |
| 11,492,468 B2 * | 11/2022 | Biswas | C08L 23/06 |
| 2010/0099824 A1 * | 4/2010 | Helland | C08J 5/18 |
| | | | 525/240 |
| 2016/0108185 A1 | 4/2016 | Wang et al. | |
| 2016/0229964 A1 | 8/2016 | Bellehumeur et al. | |
| 2022/0288899 A1 * | 9/2022 | Camelo | B32B 27/306 |
| 2023/0312787 A1 * | 10/2023 | Sandkuehler | C08F 210/16 |
| | | | 525/240 |

FOREIGN PATENT DOCUMENTS

| | | |
|---|---|---|
| WO | 2008089978 A1 | 7/2008 |
| WO | 2015200743 A1 | 12/2015 |
| WO | 2017040127 A1 | 3/2017 |
| WO | 2018172510 A1 | 9/2018 |

OTHER PUBLICATIONS

Chinese Office Action dated Nov. 29, 2024, pertaining to CN Patent Application No. 202180060505.5, 14 pgs.
Japanese Office Action dated Dec. 24, 2024, pertaining to JP Patent Application No. 2022-577261, 11 pgs.
Indonesia Substantive Examination Report dated Dec. 24, 2024, pertaining to ID Patent Application No. P00202300848, 6 pgs.
Indonesian Examination Report dated Apr. 23, 2025, pertaining to ID Patent Application No. P00202300848, 6 pgs.
International Search Report and Written Opinion dated May 3, 2021, pertaining to Int'l Patent Application No. PCT/US2021/016815, 9 pgs.
Karjala et al. "Detection of Low Levels of Long-Chain Branching in Polyolefins", Antec 2008, 5 pgs.
Williams et al. "The Construction of a Polyethylene Calibration Curve for Gel Permeation Chromatography Using Polystyrene Fractions", Polymer Letters vol. 6, pp. 621-624 (1968).
Communication pursuant to Article 94(3), dated Mar. 1, 2024, pertaining to EP Patent Application No. 21709253.5, 3 pgs.
Chinese Office Action dated May 29, 2025, pertaining to CN Patent Application No. 202180060505.5, 6 pgs.

* cited by examiner

POLYETHYLENE COMPOSITIONS AND FILMS INCLUDING POLYETHYLENE COMPOSITIONS

CROSS REFERENCE TO RELATED APPLICATIONS

This application is a National Phase Entry under 35 U.S.C. § 371 of International Patent Application No. PCT/US2021/016815 filed Feb. 5, 2021, which claims the benefit of U.S. Provisional Application Ser. No. 63/046,386 filed Jun. 30, 2020, both of which are hereby incorporated by reference in their entirety.

TECHNICAL FIELD

Embodiments described herein generally relate to polyethylene compositions and, more specifically, relate to multilayer films including polyethylene compositions.

BACKGROUND

Multilayer films are used in packaging applications, including flexible packaging applications. It is beneficial for monolayer and multilayer polymer films, which may include blown or cast films, to demonstrate sufficient toughness and puncture properties while allowing for a reduction of material costs, for example, from down-gauging (i.e., using thinner film thicknesses), or reducing or eliminating relatively expensive materials, such as polyamides.

SUMMARY

Various polymerization techniques using different catalyst systems have been employed to produce such polyolefin compositions suitable for packaging applications. However, despite the research efforts in developing compositions suitable for packaging applications, there is still a need for compositions suitable for packaging applications having a good balance of physical properties at desirable polymer composition densities. Additionally, to achieve this balance, conventional methods may incorporate a polar material, such as polyamide, which may increase process complexity, increase film structure complexity, produce non-recyclable multilayer films, and increase material costs when compared to utilizing other polyolefins.

Therefore, it is beneficial for monolayer and multilayer polymer films, which may include blown or cast films, to demonstrate toughness while allowing for a reduction of material costs and/or increased recyclability. There are needs for multilayer films that exhibit stiffness and physical properties, such as puncture properties, that meet customer and industry requirements.

Embodiments of the present disclosure meet those needs by providing a polyethylene composition that, when utilized in monolayer or multilayer films, may provide a balance of improved stiffness and improved abuse properties (e.g. dart, puncture energy, tear). In one or more embodiments, the polyethylene composition may include a first polyethylene fraction area, a second polyethylene fraction area, and a third polyethylene fraction area, where each fraction has an area within the elution profile as described herein. The use of such polyethylene compositions may allow for a suitable puncture properties versus modulus.

According to one or more embodiments, a polyethylene composition is provided. The polyethylene composition may include a first polyethylene fraction area in the temperature range from 45° C. to 80° C. of an elution profile via improved comonomer composition distribution (iCCD) analysis method; a second polyethylene fraction area in the temperature range from 80° C. to 95° C. of the elution profile via ICCD analysis method, and a third polyethylene fraction area in the temperature range from 95° C. to 120° C. of the elution profile via ICCD analysis method. The second polyethylene fraction area may include at least 5% of the total area of the elution profile. The third polyethylene fraction area may include at least 25% of the total area of the elution profile. A ratio of the first polyethylene fraction area to the second polyethylene fraction area may be from 6 to 15. The polyethylene composition may have a density of 0.910 g/cm$^3$ to 0.924 g/cm$^3$ and a melt index (I$_2$) of 0.1 g/10 minutes to 0.5 g/10 minutes.

According to one or more embodiments, a polyethylene composition is provided. The polyethylene composition may include a first polyethylene fraction area in the temperature range from 45° C. to 80° C. of an elution profile via improved comonomer composition distribution (iCCD) analysis method; a second polyethylene fraction area in the temperature range from 80° C. to 95° C. of the elution profile via ICCD analysis method, wherein the second polyethylene fraction area comprises at least 5% of the total area of the elution profile; and a third polyethylene fraction area in the temperature range from 95° C. to 120° C. of the elution profile via ICCD analysis method, wherein the third polyethylene fraction area comprises at least 25% of the total area of the elution profile. The polyethylene composition may have a density of 0.910 g/cm$^3$ to 0.924 g/cm$^3$, a melt index (I$_2$) of 0.1 g/10 minutes to 0.5 g/10 minutes, and a molecular weight distribution, expressed as the ratio of the weight average molecular weight to number average molecular weight (Mw/Mn), in the range of from 2.0 to 5.0.

According to one or more additional embodiments, a film is provided. The film may be a monolayer film or multilayer film including a polyethylene composition in at least one layer of the film. The polyethylene composition may include a first polyethylene fraction area in the temperature range from 45° C. to 80° C. of an elution profile via improved comonomer composition distribution (iCCD) analysis method; a second polyethylene fraction area in the temperature range from 80° C. to 95° C. of the elution profile via ICCD analysis method, and a third polyethylene fraction area in the temperature range from 95° C. to 120° C. of the elution profile via ICCD analysis method. The second polyethylene fraction area may include at least 5% of the total area of the elution profile. The third polyethylene fraction area may include at least 25% of the total area of the elution profile. A ratio of the first polyethylene fraction area to the second polyethylene fraction area may be from 6 to 15. The polyethylene composition may have a density of 0.910 g/cm$^3$ to 0.924 g/cm$^3$ and a melt index (I$_2$) of 0.1 g/10 minutes to 0.5 g/10 minutes.

These and embodiments are described in more detail in the following Detailed Description in conjunction with the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
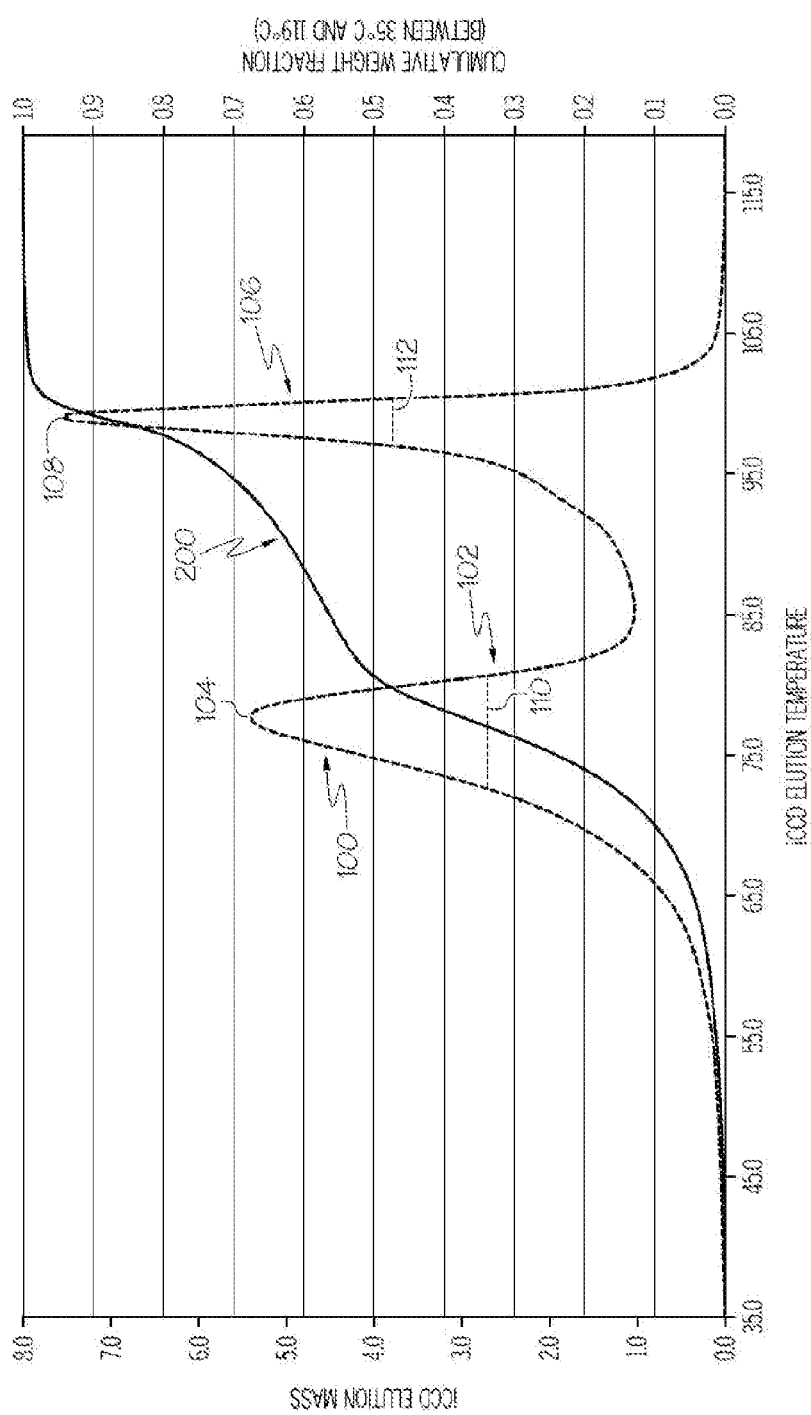
FIG. 1 graphically depicts the elution profile of a polyethylene composition, according to one or more embodiments presently described.

Specific embodiments of the present application will now be described. These embodiments are provided so that this disclosure will be thorough and complete and will fully convey the scope of the claimed subject matter to those skilled in the art.

The term "polymer" refers to a polymeric compound prepared by polymerizing monomers, whether of a same or a different type. The generic term polymer thus embraces the term "homopolymer," which usually refers to a polymer prepared from only one type of monomer as well as "copolymer," which refers to a polymer prepared from two or more different monomers. The term "interpolymer," as used herein, refers to a polymer prepared by the polymerization of at least two different types of monomers. The generic term interpolymer thus includes a copolymer or polymer prepared from more than two different types of monomers, such as terpolymers.

"Polyethylene" or "ethylene-based polymer" shall mean polymers comprising greater than 50% by mole of units derived from ethylene monomer. This includes ethylene-based homopolymers or copolymers (meaning units derived from two or more comonomers). Common forms of ethylene-based polymers known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "composition," as used herein, refers to a mixture of materials that comprises the composition, as well as reaction products and decomposition products formed from the materials of the composition.

"Polypropylene" or "propylene-based polymer" as used herein, refers to a polymer that comprises, in polymerized form, greater than 50% by mole of units that have been derived from propylene monomer. This includes propylene homopolymer, random copolymer polypropylene, impact copolymer polypropylene, propylene/α-olefin copolymer, and propylene/α-olefin copolymer.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see, for example, U.S. Pat. No. 4,599,392, which is hereby incorporated by reference in its entirety). LDPE resins typically have a density in the range of 0.916 g/cm$^3$ to 0.940 g/cm$^3$.

The term "LLDPE," includes resin made using Ziegler-Natta catalyst systems as well as resin made using single-site catalysts, including, but not limited to, bis-metallocene catalysts (sometimes referred to as "m-LLDPE"), phosphinimine, and constrained geometry catalysts, and resins made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. Nos. 5,272,236, 5,278,272, 5,582,923, 5,733,155 each of which are incorporated herein by reference in their entirety; the homogeneously branched linear ethylene polymer compositions such as those in U.S. Pat. No. 3,645,992 which is incorporated herein by reference in its entirety; the heterogeneously branched ethylene polymers such as those prepared according to the process disclosed in U.S. Pat. No. 4,076,698 which is incorporated herein by reference in its entirety; and blends thereof (such as those disclosed in U.S. Pat. Nos. 3,914,342, 5,854,045 which are incorporated herein by reference in their entirety. The LLDPE resins can be made via gas-phase, solution-phase, or slurry polymerization or any combination thereof, using any type of reactor or reactor configuration known in the art.

The term "HDPE" refers to polyethylenes having densities greater than 0.935 g/cm$^3$ and up to 0.980 g/cm$^3$, which are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "ULDPE" refers to polyethylenes having densities of 0.855 g/cm$^3$ to 0.912 g/cm$^3$, which are generally prepared with Ziegler-Natta catalysts, chrome catalysts, or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy). ULDPEs include, but are not limited to, polyethylene (ethylene-based) plastomers and polyethylene (ethylene-based) elastomers. Polyethylene (ethylene-based) elastomers plastomers generally have densities of 0.855 g/cm$^3$ to 0.912 g/cm$^3$.

"Blend," "polymer blend," and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

"Multilayer structure" or "multilayer film" means any structure having more than one layer. For example, the multilayer structure (for example, a film) may have two, three, four, five, six, seven, or more layers. A multilayer structure may be described as having the layers designated with letters. For example, a three-layer structure designated as A/B/C may have a core layer, (B), and two external layers, (A) and (C).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of"

excludes from the scope of any succeeding recitation any other component, step or procedure, excepting those that are not essential to operability. The term "consisting of" excludes any component, step or procedure not specifically delineated or listed.

Multimodal Polyethylene Composition and Characterization

As used herein, the presently-disclosed polyethylene compositions may be referred to as "multimodal polyethylene compositions." In one or more embodiments, the multimodal polyethylene composition is formed from the polymerization of ethylene and a comonomers such as a $C_3$-$C_{12}$ alkene. Contemplated comonomers include $C_6$-$C_9$ alkenes, such as 1-octene and 1-hexene. In one or more embodiments, the comonomers is 1-octene.

In one or more embodiments, the multimodal polyethylene composition may have a density of from 0.910 g/cm$^3$ to 0.924 g/cm$^3$, when measured according to ASTM D792. In embodiments, the presently disclosed multimodal polyethylene compositions may have densities of from 0.910 g/cm$^3$ to 0.922 g/cm$^3$, from 0.910 g/cm$^3$ to 0.920 g/cm$^3$, from 0.910 g/cm$^3$ to 0.918 g/cm$^3$, from 0.910 g/cm$^3$ to 0.916 g/cm$^3$, from 0.910 g/cm$^3$ to 0.914 g/cm$^3$, from 0.910 g/cm$^3$ to 0.912 g/cm$^3$, from 0.912 g/cm$^3$ to 0.924 g/cm$^3$, from 0.912 g/cm$^3$ to 0.922 g/cm$^3$, from 0.912 g/cm$^3$ to 0.920 g/cm$^3$, from 0.912 g/cm$^3$ to 0.918 g/cm$^3$, from 0.912 g/cm$^3$ to 0.916 g/cm$^3$, from 0.912 g/cm$^3$ to 0.914 g/cm$^3$, from 0.914 g/cm$^3$ to 0.924 g/cm$^3$, from 0.914 g/cm$^3$ to 0.922 g/cm$^3$, from 0.914 g/cm$^3$ to 0.920 g/cm$^3$, from 0.914 g/cm$^3$ to 0.918 g/cm$^3$, from 0.914 g/cm$^3$ to 0.916 g/cm$^3$, from 0.916 g/cm$^3$ to 0.924 g/cm$^3$, from 0.916 g/cm$^3$ to 0.922 g/cm$^3$, from 0.916 g/cm$^3$ to 0.920 g/cm$^3$, from 0.916 g/cm$^3$ to 0.918 g/cm$^3$, from 0.918 g/cm$^3$ to 0.924 g/cm$^3$, from 0.918 g/cm$^3$ to 0.922 g/cm$^3$, from 0.918 g/cm$^3$ to 0.920 g/cm$^3$, from 0.920 g/cm$^3$ to 0.924 g/cm$^3$, from 0.920 g/cm$^3$ to 0.922 g/cm$^3$, from 0.922 g/cm$^3$ to 0.924 g/cm$^3$, or any combination of these ranges, when measured according to ASTM D792.

In one or more embodiments, the multimodal polyethylene composition may have a melt index ($I_2$) of from 0.1 g/10 minutes (g/10 min) to 0.5 g/10 min, when measured according to ASTM D-1238 at 190° C. and 2.16 kg. In embodiments, the multimodal polyethylene composition may have a melt index ($I_2$) of from 0.1 g/10 min to 0.4 g/10 min, from 0.1 g/10 min to 0.3 g/10 min, from 0.1 g/10 min to 0.2 g/10 min, from 0.2 g/10 min to 0.5 g/10 min, from 0.2 g/10 min to 0.4 g/10 min, from 0.2 g/10 min to 0.3 g/10 min, from 0.3 g/10 min to 0.5 g/10 min, from 0.3 g/10 min to 0.4 g/10 min, from 0.4 g/10 min to 0.5 g/10 min, or any combination of these ranges when measured according to ASTM D-1238 at 190° C. and 2.16 kg.

According to embodiments, the multimodal polyethylene compositions may have a molecular weight distribution, expressed as the ratio of the weight average molecular weight to number average molecular weight (Mw/Mn), in the range of from 2.0 to 5.0. In embodiments, the multimodal polyethylene composition may have a molecular weight distribution of from 2.0 to 4.5, from 2.0 to 4.0, from 2.0 to 3.5, from 2.0 to 3.0, from 2.0 to 2.5, from 2.5 to 5.0, from 2.5 to 4.5, from 2.5 to 4.0, from 2.5 to 3.5, from 2.5 to 3.0, from 3.0 to 5.0, from 3.0 to 4.5, from 3.0 to 4.0, from 3.0 to 3.5, from 3.5 to 5.0, from 3.5 to 4.5, from 3.5 to 4.0, from 4.0 to 5.0, from 4.0 to 4.5, from 4.5 to 5.0, or any combination of these ranges. As presently described, the molecular weight distribution may be calculated according to gel permeation chromatography (GPC) techniques as described herein.

According to one or more embodiments, the multimodal polyethylene composition may have a zero shear viscosity ratio of from 3.0 to 6.0. In embodiments, the multimodal polyethylene composition may have a zero shear viscosity ratio of from 3.0 to 5.5, from 3.0 to 5.0, from 3.0 to 4.5, from 3.0 to 4.0, from 3.0 to 3.5, from 3.5 to 6.0, from 3.5 to 5.5, from 3.5 to 5.0, from 3.5 to 4.5, from 3.5 to 4.0, from 4.0 to 6.0, from 4.0 to 5.5, from 4.0 to 5.0, from 4.0 to 4.5, from 4.5 to 6.0, from 4.5 to 5.5, from 4.5 to 5.0, from 5.0 to 6.0, from 5.0 to 5.5, from 5.5 to 6.0, or any combination of these ranges.

According to additional embodiments, the multimodal polyethylene compositions may have Dow Rheology Index of less than or equal to 5, such as less than or equal to 4, less than or equal to 3, less than or equal to 2, or even less than or equal to 1.

In one or more embodiments, the presently-disclosed multimodal polyethylene compositions may further comprise additional components such as one or more additives. Such additives include, but are not limited to, antistatic agents, color enhancers, dyes, lubricants, fillers such as $TiO_2$ or $CaCO_3$, opacifiers, nucleators, processing aids, pigments, primary anti-oxidants, secondary anti-oxidants, UV stabilizers, anti-blocks, slip agents, tackifiers, fire retardants, anti-microbial agents, odor reducer agents, anti-fungal agents, and combinations thereof. The multimodal polyethylene compositions may contain from 0.1 to 10 percent by the combined weight of such additives, based on the weight of the multimodal polyethylene composition including such additives.

As described herein, a polyethylene "fraction" refers to a portion of the total composition of the multimodal polyethylene composition. The presently-disclosed embodiments include at least a "first polyethylene fraction," a "second polyethylene fraction," and a "third polyethylene fraction." The various fractions included in the multimodal polyethylene composition may be quantified by their temperature range in an elution profile via improved comonomer composition distribution (iCCD) analysis method. Unless specified, any elution profile referred to herein is the elution profile observed via iCCD. Examples of such fractions will be better understood in view of the examples provided herewith. In general, the first fraction may include a peak in the temperature range of the first fraction, the second fraction may include a peak in the temperature range of the second fraction, and the third fraction may include a peak in the temperature range of the third fraction. The multimodal polyethylene compositions described herein may be referred to as "multimodal," meaning that they include at least two peaks in their elution profile. Some embodiments may be "trimodal," meaning that three major peaks are present.

In reference to the described iCCD distribution, FIG. 1 schematically depicts a sample iCCD distribution 100 along with the cumulative weight fraction curve 200. FIG. 1 depicts, generally, several features of iCCD profiles, including a fraction 102 and a fraction 106. The fraction 102 has a peak 104 and the fraction 106 has a peak 108. Each fraction has a half peak width 110 and 112. It should be understood that the profile of FIG. 1 is not derived from experimentation or observation, but is instead supplied for informational purposes of describing particular features of an iCCD elution profile.

In one or more embodiments, the multimodal polyethylene compositions described herein may have a first polyethylene fraction defined by an area in the temperature range from 45° C. to 80° C. of an elution profile via improved comonomer composition distribution (iCCD) analysis method. As used herein, in some embodiments, the first polyethylene fraction area may be defined as the area in the elution profile beneath the single peak of the first polyethylene fraction between 45° C. and 80° C. The first polyethylene area fraction may correspond with the total relative mass of the polymer fraction in the multimodal polyethylene composition.

In embodiments, the first polyethylene fraction may have a single peak in a temperature range of 45° C. to 80° C. in an elution profile via iCCD. As used herein, a "single peak" refers to an iCCD wherein a particular fraction includes only a single peak. That is, in some embodiments, the iCCD of the first polyethylene fraction includes only an upward sloping region followed by a downward sloping region to form the single peak. In one or more embodiments, the single peak of the first polyethylene fraction may be in a temperature range of from 45° C. to 80° C., such as from 40° C. to 75° C. Without being bound by theory, it is believed that in at least some embodiments of the presently-disclosed polyethylene composition where a dual reactor design is used for polymerization, a combination of higher density crystalline domain and lower density amorphous domain may exist. The impact strength is controlled predominantly by the amorphous region or the tie concentrations that connect the adjacent lamellae. The relative tie chain concentration is estimated to be relatively large when the density is less than 0.910 g/cm$^3$. The peak of the first polymer fraction in the presently disclosed compositions may lie in the temperature range of 45° C. to 80° C., which may provide greater tie-chain concentration for functional benefits such as improved toughness.

It should be understood that a peak in the first polyethylene fraction may not be formed by a local minimum in the respective polyethylene fraction at a defined temperature boundary. That is, the peak must be a peak in the context of the entire spectrum, not a peak formed by the threshold temperature of a polyethylene fraction. For example, if a single peak followed by a single valley were present in a polyethylene fraction (an upward slope followed by a downward slope followed by an upward slope), only a single peak would be present in such a polyethylene fraction.

In one or more embodiments, the first polyethylene fraction area may comprise at least 40% of the total area of the elution profile (for example, at least 42%, at least 44%, at least 46%, at least 48%, at least 50%, at least 52%, or even at least 54% of the total area of the elution profile). For example, the first polyethylene fraction area may comprise from 40% to 65% of the total area of the elution profile, such as from 40% to 60%, from 40% to 55%, from 40% to 50%, from 40% to 45%, from 45% to 65%, from 45% to 60%, from 45% to 55%, from 45% to 50%, from 50% to 65%, from 50% to 60%, from 50% to 55%, from 55% to 65%, from 55% to 60%, or from 60% to 65% of the total area of the elution profile.

In one or more embodiments, the weight average molecular weight of the first polyethylene fraction may be less than or equal to 250,000 g/mol, such as from 20,000 g/mol to 250,000 g/mol, or from 20,000 g/mol to 200,000 g/mol. In embodiments, the weight average molecular weight of the first polyethylene fraction may be from 20,000 g/mol to 250,000 g/mol, from 20,000 g/mol to 200,000 g/mol, from 20,000 g/mol to 150,000 g/mol, from 20,000 g/mol to 100,000 g/mol, from 20,000 g/mol to 50,000 g/mol, from 50,000 g/mol to 250,000 g/mol, from 50,000 g/mol to 200,000 g/mol, from 50,000 g/mol to 150,000 g/mol, from 50,000 g/mol to 100,000 g/mol, from 100,000 g/mol to 250,000 g/mol, from 100,000 g/mol to 200,000 g/mol, from 100,000 g/mol to 150,000 g/mol, from 150,000 g/mol to 250,000 g/mol, from 150,000 g/mol to 200,000 g/mol, from 200,000 g/mol to 250,000 g/mol, or any combination of these ranges. Molecular weight of the polyethylene fractions may be calculated based on GPC results, as described hereinbelow.

In one or more embodiments, the multimodal polyethylene composition may have a second polyethylene fraction defined by an area in the temperature range from 80° C. to 95° C. of an elution profile via improved comonomer composition distribution (iCCD) analysis method. As used herein, in some embodiments, the second polyethylene fraction area may be defined as the area in the elution profile beneath a single peak of the second polyethylene fraction between 80° C. and 95° C. Without being bound by theory, it is believed that the comonomer distribution in the second polyethylene fraction may contribute to improved properties when the multimodal polyethylene composition is extruded into a film. For example, such improved properties may include improved puncture resistance.

The second polyethylene area fraction may correspond with the total relative mass of the polymer fraction in the multimodal polyethylene composition. In one or more embodiments, the second polyethylene fraction may include a local minimum in an elution profile. This local minimum may fall between the peak in the first polyethylene fraction and a peak in the third polyethylene fraction.

According to one or more embodiments, the second polyethylene fraction area may comprise at least 5% of the total area of the elution profile (for example, at least 6%, at least 8%, or even at least 10% of the total area of the elution profile). For example, the first polyethylene fraction area may comprise from 5% to 15%, from 5% to 10%, or from 10% to 15 of the total area of the elution profile.

According to some embodiments, a ratio of the first polyethylene fraction area to the second polyethylene fraction area may be from 6 to 15, from 6 to 10, from 10 to 15, or any combination of these ranges.

According to some embodiments, a ratio of the weight average molecular weight of the first polyethylene fraction area to a weight average molecular weight of the second polyethylene fraction area may be from 0.75 to 1.50, from 0.75 to 1.25, from 0.75 to 1.00, from 1.00 to 1.50, from 1.00 to 1.25, from 1.25 to 1.50, or any combination of these ranges.

In one or more embodiments, the weight average molecular weight of the second polyethylene fraction may be from 80,000 g/mol to 200,000 g/mol, or from 80,000 g/mol to 150,000 g/mol. In additional embodiments, the weight average molecular weight of the second polyethylene fraction may be from 80,000 g/mol to 200,000 g/mol, from 80,000 g/mol to 150,000 g/mol, from 80,000 g/mol to 100,000 g/mol, from 100,000 g/mol to 200,000 g/mol, from 100,000 g/mol to 150,000 g/mol, from 150,000 g/mol to 200,000 g/mol or any combination of these ranges. Molecular weight of the polyethylene fractions may be calculated based on GPC results, as described hereinbelow.

In one or more embodiments, the multimodal polyethylene composition may have a third polyethylene fraction defined by an area in the temperature range from 95° C. to 120° C. of an elution profile via improved comonomer composition distribution (iCCD) analysis method. As used herein, in some embodiments, the third polyethylene fraction area may be defined as the area in the elution profile beneath a single peak of the third polyethylene fraction between 95° C. and 120° C. The first polyethylene area fraction may correspond with the total relative mass of the polymer fraction in the multimodal polyethylene composition.

In one or more embodiments, the third polyethylene fraction may have a single peak in the temperature range of 95° C. and 120° C. in the elution profile via iCCD. It should be understood that a peak in the third polyethylene fraction may not be formed by a local minimum in the respective polyethylene fraction at a defined temperature boundary. That is, the peak must be a peak in the context of the entire spectrum, not a peak formed by the threshold temperature of a polyethylene fraction. For example, if a single peak followed by a single valley were present in a polyethylene fraction (an upward slope followed by a downward slope followed by an upward slope), only a single peak would be present in such a polyethylene fraction. The temperature range of the third polyethylene fraction of 95 to 120° C. may be desirable because the low molecular weight, high density component at 95° C. and 120° C. may allow the polyethylene to achieve higher overall density while maintaining a lower density fraction.

In one or more embodiments, the width of the single peak of the third polyethylene fraction at 50 percent peak height may be from 2° C. to 10° C., from 2° C. to 8° C., from 2° C. to 6° C., from 2° C. to 4° C., from 4° C. to 10° C., from 4° C. to 8° C., from 4° C. to 6° C., from 6° C. to 10° C., from 6° C. to 8° C., or from 8° C. to 10° C. Generally, lesser temperature ranges at 50 percent peak heights correspond to a "sharper" peak. Without being bound by any particular theory, it is believed that a "sharper" or "narrower" peak is a characteristic caused by the molecular catalyst and indicates minimum comonomer incorporation on the higher density fraction, enabling higher density split between the first polyethylene fraction and the third polyethylene fraction.

According to one or more embodiments, the third polyethylene fraction area may comprise at least 25% of the total area of the elution profile (for example, at least 30%, at least 35%, or even at least 40% of the total area of the elution profile). For example, the first polyethylene fraction area may comprise from 25% to 50%, from 25% to 45%, from 25% to 40%, from 25% to 35%, from 25% to 30%, from 30% to 50%, from 30% to 45%, from 30% to 40%, from 30% to 35%, from 35% to 50%, from 35% to 45%, from 35% to 40%, from 40% to 50%, from 40% to 45%, for rom 45% to 50% of the total area of the elution profile.

In one or more embodiments, the weight average molecular weight of the third polyethylene fraction may be less than or equal to 120,000 g/mol, such as from 20,000 g/mol to 120,000 g/mol, or from 40,000 g/mol to 65,000 g/mol. In additional embodiments, the weight average molecular weight of the third polyethylene fraction may be from 20,000 g/mol to 40,000 g/mol, from 40,000 g/mol to 60,000 g/mol, from 60,000 g/mol to 80,000 g/mol, from 80,000 g/mol to 100,000 g/mol, from 100,000 g/mol to 120,000 g/mol, or any combination of these ranges. Molecular weight of the polyethylene fractions may be calculated based on GPC results, as described herein below.

According to one or more embodiments, the difference between the single peak of the second polyethylene fraction and the single peak of the first polyethylene fraction may be at least 5° C. For example, the difference between the single peak of the second polyethylene fraction and the single peak of the first polyethylene fraction may be at least 6° C., 7° C., 8° C., 9° C., 10° C., 11° C., 12° C., 14° C., 16° C., 18° C., or even at least 20° C.

Polymerization

Any conventional polymerization processes may be employed to produce the multimodal polyethylene compositions described herein. Such conventional polymerization processes include, but are not limited to, slurry polymerization processes, solution polymerization process, using one or more conventional reactors, e.g., loop reactors, isothermal reactors, stirred tank reactors, batch reactors in parallel, series, and/or any combinations thereof. The multimodal polyethylene composition may, for example, be produced via solution phase polymerization process using one or more loop reactors, isothermal reactors, and combinations thereof.

In general, the solution phase polymerization process may occur in one or more well-mixed reactors such as one or more isothermal loop reactors or one or more adiabatic reactors at a temperature in the range of from 115 to 250° C. (e.g., from 115 to 210° C.), and at pressures in the range of from 300 to 1,000 psi (e.g., from 400 to 800 psi). In some embodiments, in a dual reactor, the temperature in the first reactor is in the range of from 115 to 190° C. (e.g., from 160 to 180° C.), and the second reactor temperature is in the range of 150 to 250° C. (e.g., from 180 to 220° C.). In embodiments, in a single reactor, the temperature in the reactor is in the range of from 115 to 250° C. (e.g., from 115 to 225° C.).

The residence time in solution phase polymerization process may be in the range of from 2 to 30 minutes (e.g., from 5 to 25 minutes). Ethylene, solvent, hydrogen, one or more catalyst systems, optionally one or more cocatalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Texas. The resultant mixture of the multimodal polyethylene composition and solvent is then removed from the reactor and the multimodal polyethylene composition is isolated. Solvent is typically recovered via a solvent recovery unit, e.g., heat exchangers and vapor liquid separator drum, and is then recycled back into the polymerization system.

In some embodiments, the multimodal polyethylene composition may be produced via solution polymerization in a dual reactor system, for example a dual loop reactor system, wherein ethylene is polymerized in the presence of one or more catalyst systems. In some embodiments, only ethylene is polymerized. Additionally, one or more cocatalysts may be present. In another embodiment, the multimodal polyethylene composition may be produced via solution polymerization in a single reactor system, for example a single loop reactor system, wherein ethylene is polymerized in the presence of two catalyst systems. In some embodiments, only ethylene is polymerized.

Catalyst Systems

Specific embodiments of catalyst systems will now be described, which can, in one or more embodiments, be used to produce the multimodal polyethylene compositions described herein. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

The term "independently selected" is used herein to indicate that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{40})$alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical may contain more than y carbon atoms depending on the identity of any groups $R^S$. For example, a "$(C_1-C_{40})$alkyl substituted with exactly one group $R^S$, where $R^S$ is phenyl ($—C_6H_5$)" may contain from 7 to 46 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or function group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent.

The term "—H" means a hydrogen or hydrogen radical that is covalently bonded to another atom. "Hydrogen" and "—H" are interchangeable, and unless clearly specified mean the same thing.

The term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more $R^S$.

In this disclosure, a $(C_1-C_{40})$hydrocarbyl can be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In some embodiments, each of the aforementioned $(C_1-C_{40})$hydrocarbyl groups has a maximum of 20 carbon atoms (i.e., $(C_1-C_{20})$hydrocarbyl) and embodiments, a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" (with square brackets) means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl unsubstituted $(C_6-C_{18})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_1-C_{20})$aryl; substituted $(C_6-C_{18})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene include unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on the same carbon atom (e.g., —$CH_2$—) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of $(C_2-C_{20})$alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of $(C_6-C_{50})$ arylene α,ω-diradicals include phenyl-1,4-diyl, napthalen-2,6-diyl, or napthalen-3,7-diyl.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{50})$alkylene are unsubstituted $(C_1-C_{20})$alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C^*HCH_3$, and —$(CH_2)_4C^*(H)(CH_3)$, in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —$CF_2$—, —$C(O)$—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a $(C_1-C_{18})$ alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo [2.2.2]octane.

The term "$(C_3-C_{40})$cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of heteroatoms include O, S, S(O), S(O)$_2$, Si($R^C$)$_2$, P($R^P$), N($R^N$), —N=C($R^C$)$_2$, —Ge($R^C$)$_2$—, or —Si($R^C$)—, where each $R^C$, each $R^N$, and each $R^P$ is unsubstituted $(C_1-C_{18})$hydrocarbyl or —H. The term "heterohydrocarbon" refers to a molecule or molecular framework in which one or more carbon atoms are replaced with a heteroatom. The term "$(C_1-C_{40})$heterohydrocarbyl" means a heterohydrocarbon radical of from 1 to 40 carbon atoms and the term "$(C_1-C_{40})$heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each $(C_1-C_{50})$ heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The $(C_1-C_{40})$heterohydrocarbyl may be unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si($R^C$)$_2$—, $(C_1-C_{40})$hydrocarbyl-N($R^N$)—, $(C_1-C_{40})$hydrocarbyl-P($R^P$)—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$ heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{40})$heteroaryl" means an unsubstituted or substituted (by one or more $R^S$) mono-, bi- or tricyclic heteroaromatic hydrocarbon radical of from 4 to 40 total carbon atoms and from 1 to 10 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing $(C_1-C_{50})$ carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include Si($R^C$)$_3$, Ge($R^C$)$_3$, Si($R^C$)$_2$, Ge($R^C$)$_2$, P($R^P$)$_2$, P($R^P$), N($R^N$)$_2$, N(RN), N, O, OR$^C$, S, SR$^C$, S(O), and S(O)$_2$, wherein each of the heteroalkyl and heteroalkylene groups are unsubstituted or substituted by one or more $R^S$.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride (F$^-$), chloride (Cl$^-$), bromide (Br$^-$), or iodide (I$^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any.

According to some embodiments, a catalyst system for producing a polyethylene composition includes a metal-ligand complex according to formula (I):

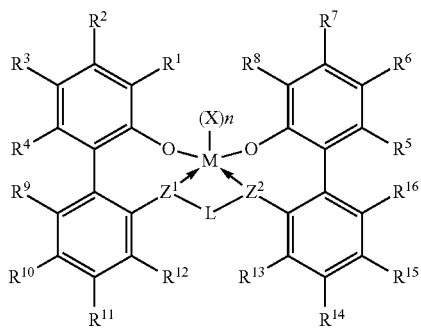

In formula (I), M is a metal chosen from titanium, zirconium, or hafnium, the metal being in a formal oxidation state of +2, +3, or +4; n is 0, 1, 2, or 3. when n is 0 and X is absent or, for each nonzero n, each X independently is a monodentate ligand that is neutral, monoanionic, or dianionic; or two Xs are taken together to form a bidentate ligand that is neutral, monoanionic, or dianionic. When n is 1, X is a monodentate ligand or a bidentate ligand; when n is 2, each X is a monodentate ligand and is the same or different; the metal-ligand complex is overall charge-neutral. Each Z is independently chosen from —O—, —S—, —N($R^N$)—, or —P($R^P$)—; L is ($C_1$-$C_{40}$)hydrocarbylene or ($C_1$-$C_{40}$)heterohydrocarbylene, wherein the ($C_1$-$C_{40}$)hydrocarbylene has a portion that comprises a 1-carbon atom to 10-carbon atom linker backbone linking the two Z groups in Formula (I) (to which L is bonded) or the ($C_1$-$C_{40}$)heterohydrocarbylene has a portion that comprises a 1-atom to 10-atom linker backbone linking the two Z groups in Formula (I), wherein each of the 1 to 10 atoms of the 1-atom to 10-atom linker backbone of the ($C_1$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^C$), or N($R^C$), wherein independently each $R^C$ is ($C_1$-$C_{30}$)hydrocarbyl or ($C_1$-$C_{30}$)heterohydrocarbyl; $R^1$ and $R^8$ are independently selected from the group consisting of —H, ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, and radicals having formula (II), formula (III), or formula (IV):

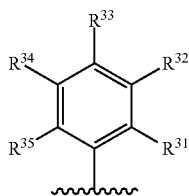

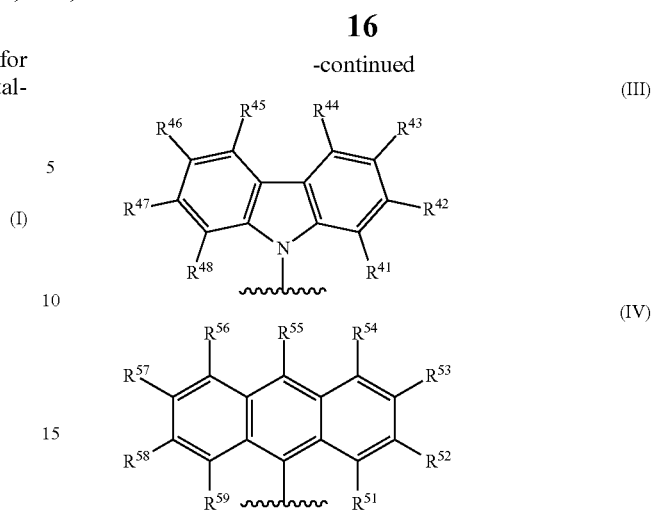

In formulas (II), (III), and (IV), each of $R^{31-35}$, $R^{41-48}$, or $R^{51-59}$ is independently chosen from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CH$R^C$, —O$R^C$, —S$R^C$, —S$R^C$, —NO$_2$, —CN, —CR$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, or —H, provided at least one of $R^1$ or $R^8$ is a radical having formula (II), formula (III), or formula (IV).

In formula (I), each of $R^{2-4}$, $R^{5-7}$, and $R^{9-16}$ is independently selected from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CH$R^C$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^C$)$_2$NC(O)—, halogen, and —H.

In some embodiments, the multimodal polyethylene composition is formed using a first catalyst according to formula (I) in a first reactor and a different catalyst according to formula (I) in a second reactor.

In one exemplary embodiment where a series dual reactor configuration is used, the procatalyst used in the first reactor, such as a continuously stirred tank reactor (CSTR), may include a hafnium metal center (M) and the structures are shown structure (V) below.

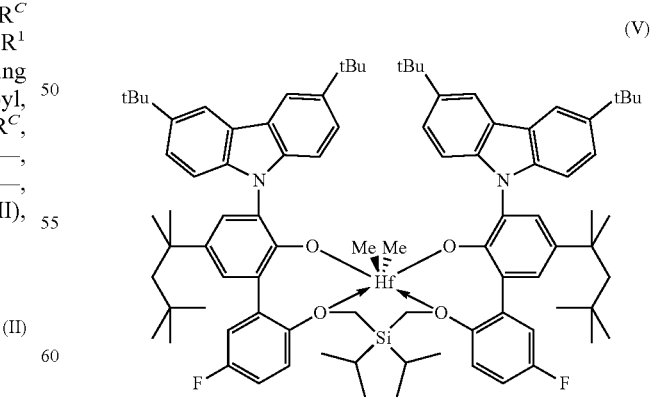

In such an embodiment, the procatalyst used in the second reactor, such as loop reactor, may include a hafnium metal center (M) and the structures are shown structure (VI) below.

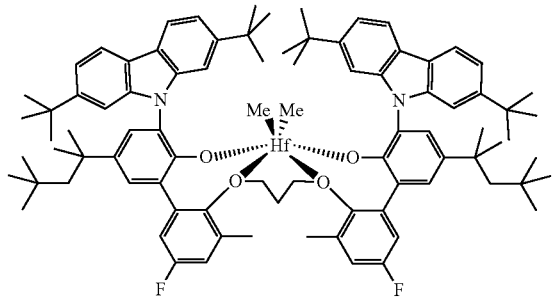

(VI)

Co-Catalyst Component

The catalyst system comprising a metal-ligand complex of formula (I) may be rendered catalytically active by any technique known in the art for activating metal-based catalysts of olefin polymerization reactions. For example, the system comprising a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 ($C_1$-$C_{20}$)hydrocarbyl substituents as described herein. In one embodiment, Group 13 metal compounds are tri(($C_1$-$C_{20}$)hydrocarbyl)-substituted-aluminum or tri(($C_1$-$C_{20}$)hydrocarbyl)-boron compounds. In embodiments, Group 13 metal compounds are tri(hydrocarbyl)-substituted-aluminum, tri(($C_1$-$C_{20}$)hydrocarbyl)-boron compounds, tri(($C_1$-$C_{10}$)alkyealuminum, tri(($C_6$-$C_{18}$)aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl)ammonium tetra(($C_1$-$C_{20}$)hydrocarbyeborane (e.g. bis(octadecyl)methylammonium tetrakis(pentafluorophenyl)borane). As used herein, the term "ammonium" means a nitrogen cation that is a (($C_1$-$C_{20}$)hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl, when two or more are present, may be the same or different.

Combinations of neutral Lewis acid activators (co-catalysts) include mixtures comprising a combination of a tri(($C_1$-$C_4$)alkyl)aluminum and a halogenated tri(($C_6$-$C_{18}$)aryl)boron compound, especially a tris(pentafluorophenyl)borane. Embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal—ligand complex):(tris(pentafluoro-phenylborane): (alumoxane) [e.g., (Group 4 metal-ligand complex):(tris(pentafluoro-phenylborane):(alumoxane)] are from 1:1:1 to 1:10:30, in embodiments, from 1:1:1.5 to 1:5:10

The catalyst system comprising the metal—ligand complex of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl, tetrakis(pentafluorophenyeborate (1$^-$)amine, and combinations thereof.

In some embodiments, one or more of the foregoing activating co-catalysts are used in combination with each other. An especially preferred combination is a mixture of a tri(($C_1$-$C_4$)hydrocarbyealuminum, tri(($C_1$-$C_4$)hydrocarbyeborane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some embodiments, at least 1:1000; and 10:1 or less, and in some embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Multilayer Films

Reference will now be made to embodiments of multilayer films described herein.

Multilayer films of the present disclosure may include at least two layers and as many as three, four, five, six, seven, nine, eleven, thirteen or more layers. The number of layers in the multilayer film may depend on a number of factors including, for example, the composition of each layer in the multilayer film, the desired properties of the multilayer film, the desired end-use application of the multilayer film, the manufacturing process of the multilayer film, and others. As described in more detail herein, embodiments of the multilayer film may include a first layer, as described subsequently in this disclosure and a second layer, as described subsequently in this disclosure; and one or more subskin layers, as described subsequently in this disclosure. The first layer, the second layer, or both may include the multimodal polyethylene composition described herein.

The multilayer film may be a two-layer film designated as A/B, where the first layer may be designated as (A), and the second layer may be designated as (B). As used herein, "direct contact" means that there may not be any other layers positioned between the two layers that are in direct contact with one another. In embodiments, the first layer (A) may be in direct contact with the second layer (B).

In embodiments, the multilayer film may be a three-layer film designated as A/B/C, where the first layer may be designated as (A), the second layer may be designated as (B), and the third layer may be designated as (C). In embodiments, second layer (B) may be positioned between the first layer (A) and the third layer (C), and second layer (B) may be referred to as a "middle layer" or "core layer." In embodiments, one or both of the first layer (A) and the third layer (C) may be the outermost layers of the multilayer film, which may be referred to as "outer layers." As used herein, the outermost layers of the multilayer film may be understood to mean there may not be another layer deposited over the outermost layer, such that the outermost layer is in direct contact with the surrounding air. In embodiments, the first layer (A) may be in direct contact with the second layer (B). In embodiments, the second layer (B) may be in direct contact with the third layer (C).

In embodiments, the multilayer films may include one or more layers in addition to the outer layers, and the core layer. Such additional layers may include additional layers comprising polyethylene, which may include the multimodal polyethylene composition described herein and may not, in embodiments, include the multimodal polyethylene composition described herein. In one or more embodiments, the additional polyethylene layers may include a blend of LLDPE, LDPE, MDPE, HDPE, the multimodal polyethylene composition described herein, and combinations thereof. The various polyethylene components (e.g., LLDPE, LDPE, HDPE, and the multimodal polyethylene composition described herein) may be included in the additional polyethylene layer in any amount desired according to the properties of the multilayer film that are to be achieved. Such additional layers may alternatively or additionally include one or more additional tie layers.

It should be understood that any of the foregoing layers may further comprise one or more additives as known to those of skill in the art such as, for example, plasticizers, stabilizers including viscosity stabilizers, hydrolytic stabilizers, primary and secondary antioxidants, ultraviolet light absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. Inorganic fillers, such as calcium carbonate, and the like can also be incorporated into one or more of the first layer, the second layer, the third layer, and combinations thereof. In some embodiments, the skin layers, the subskin layers, the tie layers, the barrier layer, and combinations may each include up to 5 weight percent of such additional additives based on the total weight of the respective layer. All individual values and subranges from 0 wt. % to 5 wt. % are included and disclosed herein; for example, the total amount of additives in the first layer, the second layer, or the third layer can be from 0.5 wt. % to 5 wt. %, from 0.5 wt. % to 4 wt. %, from 0.5 wt. % to 3 wt. %, from 0.5 wt. % to 2 wt. %, from 0.5 wt. % to 1 wt. %, from 1 wt. % to 5 wt. %, from 1 wt. % to 4 wt. %, from 1 wt. % to 3 wt. %, from 1 wt. % to 2 wt. %, from 2 wt. % to 5 wt. %, from 2 wt. % to 4 wt. %, from 2 wt. % to 3 wt. %, from 3 wt. % to 5 wt. %, from 3 wt. % to 4 wt. %, or from 4 wt. % to 5 wt. % based on the total weight of the respective layer. The incorporation of the additives can be carried out by any known process such as, for example, by dry blending, by extruding a mixture of the various constituents, by the conventional master batch technique, or the like.

The multilayer films of the present disclosure can have a variety of thicknesses. The thickness of the multilayer film may depend on a number of factors including, for example, the number of layers in the multilayer film, the composition of the layers in the multilayer film, the desired properties of the multilayer film, the desired end-use application of the film, the manufacturing process of the multilayer film, and others. In embodiments, the multilayer film may have a thickness of less than 205 micrometers (1 μm or microns). In embodiments, the multilayer film may have a thickness of from 15 μm to 205 μm, from 20 μm to 180 μm, from 15 μm to 180 μm, from 15 μm to 160 μm, from 15 μm to 140 μm, from 15 μm to 120 μm, from 15 μm to 100 μm, from 15 μm to 80 μm, from 15 μm to 60 μm, from 15 μm to 40 μm, from 20 μm to 160 μm, from 20 μm to 140 μm, from 20 μm to 120 μm, from 20 μm to 100 μm, from 20 μm to 80 μm, from 20 μm to 60 μm, or from 20 μm to 40 μm.

The multilayer films of the present disclosure may have an overall density that depends on a number of factors including, for example, the number of layers in the multilayer film, the composition of the layers in the multilayer film, the desired properties of the multilayer film, the desired end-use application of the film, the manufacturing process of the multilayer film, and others. In embodiments, the multilayer film may have an overall density of at least 0.925 grams per cubic centimeter ($g/cm^3$). In embodiments, the overall density of the multilayer film may be from 0.925 $g/cm^3$ to 0.970 $g/cm^3$, 0.925 $g/cm^3$ to 0.940 $g/cm^3$, from 0.925 $g/cm^3$ to 0.935 $g/cm^3$, from 0.925 $g/cm^3$ to 0.930 $g/cm^3$, from 0.930 $g/cm^3$ to 0.940 $g/cm^3$, from 0.930 $g/cm^3$ to 0.935 $g/cm^3$, from 0.935 $g/cm^3$ to 0.940 $g/cm^3$, or from 0.935 $g/cm^3$ to 0.950 $g/cm^3$.

In one or more embodiments, the multilayer films of the present disclosure may have a puncture force of at least 1 Newton per micrometer of film (N/μm), when measured in accordance with ASTM D 5748-95. In embodiments, the multilayer films of the present disclosure may have a puncture force of from 1 N/μm to 1.5 μm, from 1 N to 1.25 N/μm, or from 1.25 N/μm to 1.5 N/μm, when measured in accordance with ASTM D 5748-95.

In one or more embodiments, the multilayer films of the present disclosure may have a puncture resistance of greater than 10 Joule per cubic centimeter ($J/cm^3$), when measured in accordance with ASTM D 5748-95. In embodiments, the multilayer films of the present disclosure may have a puncture resistance of greater than 8 $J/cm^3$ or greater than 10 $J/cm^3$, when measured in accordance with ASTM D 5748-95.

The multilayer films of the present disclosure may have a puncture elongation of at least 55 millimeters (mm), when measured in accordance with ASTM D 5748-95. In embodiments, the multilayer films of the present disclosure may have a puncture elongation of from 55 mm to 150 mm, from 55 mm to 100 mm from 55 mm to 80 mm, from 55 mm to 60 mm, from 60 mm to 150 mm, from 60 mm to 100 mm, from 60 mm to 80 mm, or from 80 mm to 100 mm, when measured in accordance with ASTM D 5748-95.

Outer Layers

As stated previously, the presently disclosed multilayer films may include one or more outer layers. The outermost layers of the multilayer film, which may be referred to as "outer layers," may be understood to mean there may not be another layer deposited over the outermost layer, such that the outermost layer is in direct contact with the surrounding air. The outer layers may impart properties into the multilayer film that aid in stretch, processability, and others. An outer layer may also be referred to as a skin layer. In embodiments, one or both of the first layer (A) and the third layer (C) may be the outermost layers of the multilayer film, which may be referred to as "outer layers."

Outer layers may include sealant layers. A sealant layer is generally an outer layer of a film that can be used to adhere the film to other films, to rigid materials (e.g., trays), or to itself. Persons of ordinary skill in the art will recognize that a variety of olefin-based polymers may be used as a sealant layer in various embodiments based on the teachings herein. In some embodiments, to facilitate recyclability, a polyethylene may be the primary component of each sealant layer. One non-limiting example of a resin that can be used as a sealant layer according to some embodiments is SEALUTION™ 220. Other resins that can be used to form sealant layers include, without limitation, AFFINITY™, ELITE AT™, and ELITE™ resins, which are commercially available from The Dow Chemical Company.

In embodiments, at least one outer layer may include the multimodal polyethylene composition described herein. In embodiments, the outer layer comprising the multimodal polyethylene composition described herein may be blended with a polyethylene having a density of from 0.870 g/cm$^3$ to 0.970 g/cm$^3$. In embodiments, at least one outer layer may include greater than 20% by weight of the multimodal polyethylene composition described herein described herein below, based on the total weight of the respective layer. In one or more embodiments, each outer layer may include greater than 20% by weight of the multimodal polyethylene composition described herein, based on the total weight of the respective layer. In some embodiments, each outer layer may include from 0 wt. % to 100 wt. %, from 30 wt. % to 100 wt. %, from 50 wt. % to 80 wt. %, from 50 wt. % to 60 wt. %, from 60 wt. % to 100 wt. %, from 60 wt. % to 80 wt. %, or from 80 wt. % to 100 wt. % of the multimodal polyethylene composition described herein, based on the total weight of the respective layer. In some embodiments, outer layers that do not comprise the multimodal polyethylene composition described herein may include a polyethylene having a density of from 0.870 g/cm$^3$ to 0.970 g/cm$^3$. In embodiments, each outer layer may include an LLDPE, an HDPE, the multimodal polyethylene composition described herein, an MDPE, an LDPE, and combinations thereof.

In one or more embodiments, each outer layer may include a linear low density polyethylene (LLDPE) having a density from 0.905 g/cm$^3$ to 0.930 g/cm$^3$ when measured according to ASTM D792. In another embodiment, the density of the linear low density polyethylene may be from 0.905 g/cm$^3$ to 0.925 g/cm$^3$, from 0.905 g/cm$^3$ to 0.920 g/cm$^3$, from 0.905 g/cm$^3$ to 0.915 g/cm$^3$, from 0.905 g/cm$^3$ to 0.910 g/cm$^3$, from 0.910 g/cm$^3$ to 0.930 g/cm$^3$, from 0.910 g/cm$^3$ to 0.925 g/cm$^3$, from 0.910 g/cm$^3$ to 0.920 g/cm$^3$, from 0.910 g/cm$^3$ to 0.915 g/cm$^3$, from 0.915 g/cm$^3$ to 0.930 g/cm$^3$, from 0.915 g/cm$^3$ to 0.925 g/cm$^3$, from 0.915 g/cm$^3$ to 0.920 g/cm$^3$, from 0.920 g/cm$^3$ to 0.930 g/cm$^3$, from 0.920 g/cm$^3$ to 0.925 g/cm$^3$, from 0.925 g/cm$^3$ to 0.930 g/cm$^3$.

In one or more embodiments, each outer layer may include a linear low density polyethylene (LLDPE) having a melt index ($I_2$) from 0.2 grams per 10 minutes (g/10 min) to 6.0 g/10 min when measured according to ASTM D1238. It is also contemplated that the melt index ($I_2$) of the linear low density polyethylene may be from 0.2 g/10 min to 5.5 g/10 min, from 0.2 g/10 min to 5.0 g/10 min, or from 0.2 g/10 min to 4.5 g/10 min, from 0.5 g/10 min to 4.0 g/10 min, from 0.5 g/10 min to 3.5 g/10 min, from 0.5 g/10 min to 3.0 g/10 min, from 1.0 g/10 min to 2.0 g/10 min from 1.0 g/10 min to 1.5 g/10 min, or from 1.5 g/10 min to 2.0 g/10 min.

According to embodiments, the linear low density polyethylene may have a molecular weight distribution, expressed as the ratio of the weight average molecular weight to number average molecular weight (Mw/Mn), in the range of from 3.5 to 5.5. In additional embodiments, the linear low density polyethylene may have a molecular weight distribution in the range from 3.5 to 4.5 or from 4.5 to 5.5.

According to one or more additional embodiments, the linear low density polyethylene may have a zero shear viscosity ratio of from 1.2 to 3.0, when measured according to the test methods described herein. In embodiments, the linear low density polyethylene may have a zero shear viscosity ratio of from 1.2 to 2.5, from 1.2 to 2.0, from 2.0 to 3.0, from 2.0 to 2.5, or from 2.5 to 3.0.

Various methodologies are contemplated for producing linear low density polyethylenes. For example, linear low density polyethylene resins may be made using Ziegler-Natta catalyst systems, resin made using single-site catalysts including, but not limited to, bis-metallocene catalysts and constrained geometry catalysts, and resin made using post-metallocene molecular catalysts. Linear low density polyethylene resins may include linear, substantially linear or heterogeneous polyethylene copolymers or homopolymers. Linear low density polyethylene resins may contain less long chain branching than LDPEs and include substantially linear polyethylenes, which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. Nos. 3,914,342 or 5,854,045). Linear low density polyethylene resins may be made via gas-phase, solution-phase or slurry polymerization or any combination thereof, using any type of reactor or reactor configuration known in the art.

In one or more embodiments, each outer layer may include greater than 50% by weight linear low density polyethylene, based on the total weight of the respective layer. In some embodiments, the second layer, the third layer, or both may include from 50 wt. % to 100 wt. %, from 50 wt. % to 80 wt. %, from 50 wt. % to 60 wt. %, from 60 wt. % to 100 wt. %, from 60 wt. % to 80 wt. %, or from 80 wt. % to 100 wt. % of LLDPE, based on the total weight of the respective layer.

In embodiments, each outer layer may include a high density polyethylene (HDPE) having a density from 0.935 g/cm$^3$ and up to 0.980 g/cm$^3$ when measured according to ASTM D792. In another embodiment, the high density polyethylene may a density from 0.935 g/cm$^3$ to 0.970 g/cm$^3$, from 0.935 g/cm$^3$ to 0.960 g/cm$^3$, from 0.935 g/cm$^3$ to 0.950 g/cm$^3$, from 0.935 g/cm$^3$ to 0.940 g/cm$^3$, from 0.940 g/cm$^3$ to 0.980 g/cm$^3$, from 0.940 g/cm$^3$ to 0.970 g/cm$^3$, from 0.940 g/cm$^3$ to 0.960 g/cm$^3$, from 0.940 g/cm$^3$ to 0.950 g/cm$^3$, from 0.950 g/cm$^3$ to 0.980 g/cm$^3$, from 0.950 g/cm$^3$ to 0.970 g/cm$^3$, from 0.950 g/cm$^3$ to 0.960 g/cm$^3$, from 0.960 g/cm$^3$ to 0.980 g/cm$^3$, from 0.960 g/cm$^3$ to 0.970 g/cm$^3$, or from 0.970 g/cm$^3$ to 0.980 g/cm$^3$.

In one or more embodiments, each outer layer may include a high density polyethylene having a melt index ($I_2$) from 0.1 grams per 10 minutes (g/10 min) to 10.0 g/10 min when measured according to ASTM D1238 at a load of 2.16 kg and temperature of 190° C. It is also contemplated that the melt index ($I_2$) of the high density polyethylene may be from 0.1 g/10 min to 5.0 g/10 min, from 0.1 g/10 min to 1.0 g/10 min, or from 1.0 g/10 min to 10.0 g/10 min, from 1.0 g/10 min to 5.0 g/10 min, or from 5.0 g/10 min to 10.0 g/10 min.

Various methodologies are contemplated for producing high density polyethylene. For example, high density polyethylene resins may be made using Ziegler-Natta catalyst systems, chrome catalysts or single-site catalysts including, but not limited to, bis-metallocene catalysts and constrained geometry catalysts.

In one or more embodiments, each outer layer may include up to 50% by weight of high density polyethylene, based on the total weight of the respective layer. In some embodiments, each outer layer may include from 0 wt. % to 90 wt. %, from 15 wt. % to 80 wt. %, from 15 wt. % to 50 wt. %, from 20 wt. % to 50 wt. %, from 30 wt. % to 40 wt. %, or from 35 wt. % to 50 wt. % of high density polyethylene, based on the total weight of the respective layer.

In one or more embodiments, each outer layer may include an MDPE. The term "MDPE," when used alone refers to polyethylenes having densities from 0.917 to 0.936 g/cm³. MDPEs are typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts and polyvalent aryloxyether catalysts (typically referred to as bisphenyl phenoxy). It should be noted that MDPE may be used in one or more of the outer layers.

In one or more embodiments, each outer layer may include up to 50% by weight of MDPE, based on the total weight of the respective layer. In some embodiments, each outer layer may include from 0 wt. % to 90 wt. %, from 15 wt. % to 80 wt. %, from 15 wt. % to 50 wt. %, from 20 wt. % to 50 wt. %, from 30 wt. % to 40 wt. %, or from 35 wt. % to 50 wt. % of MDPE, based on the total weight of the respective layer.

In embodiments, each outer layer may include a low density polyethylene (LDPE). In one or more embodiments, the low density polyethylene may have a melt index from 0.1 g/10 min to 10.0 g/10 min when measured according to ASTM D1238 at a load of 2.16 kg and temperature of 190° C. In embodiments, the low density polyethylene may have a melt index from 0.1 g/10 min to 5.0 g/10 min, or from 0.5 g/10 min to 5.0 g/10 min, or from 0.5 g/10 min to 2.0 g/10 min. In embodiments, the low density polyethylene may have a density of from 0.916 g/cm³ to 0.935 g/cm³ when measured according to ASTM D792. In another embodiment, the low density polyethylene may a density from 0.916 g/cm³ to 0.925 g/cm³.

In one or more embodiments, each outer layer may include less than 50% by weight low density polyethylene, based on the total weight of the respective layer. In some embodiments, each outer layer may include from 0 wt. % to 50 wt. %, from 0 wt. % to 40 wt. %, from 0 wt. % to 35 wt. %, from 5 wt. % to 35 wt. %, from 10 wt. % to 35 wt. %, or from 15 wt. % to 35 wt. % low density polyethylene, based on the total weight of the respective layer.

In embodiments, the outer layers of the multilayer films of the present disclosure can have a variety of thicknesses. The thickness of each outer layer may depend on a number of factors including, for example, the composition of each outer layer, the desired processability properties of the multilayer film, and others. In embodiments, each outer layer may have a thickness of from 1 micrometers (1 μm or microns) to 40 μm. In embodiments, each outer layer may have a thickness of from 1 μm to 40 μm, from 1 μm to 30 μm, from 1 μm to 20 μm, from 1 μm to 10 μm, from 10 μm to 40 μm, from 10 μm to 30 μm, from 10 μm to 20 μm, from 20 μm to 40 μm, from 20 μm to 30 μm, or from 30 μm to 40 μm.

The thickness of each outer layer of the multilayer films disclosed herein may make up from 5% to 20% of the total thickness of the multilayer film. In some embodiments, the thickness of each outer layer may make up from 5% to 15%, from 5% to 10%, from 10% to 20%, from 10% to 15%, or from 15% to 20% of the total thickness of the multilayer film.

Subskin Layers

As stated previously, the presently disclosed multilayer films may include one or more subskin layers. As used herein, a subskin layer may refer to any layer positioned between the outer layers of a multilayer film. As used herein, the center subskin layer of the multilayer film may be referred to as a "middle layer" or "core layer." In various embodiments, each subskin layer may include one or more materials that impart improved dart and puncture properties into the multilayer film as compared to conventional multilayer films.

In embodiments comprising multiple subskin layers, each subskin layer may include the same materials, or each subskin layer may include different materials. For example, in a five-layer film designated as A/B/C/D/E, layer (B) and layer (D) may include the same materials or different materials. In a seven-layer film designated as A/B/C/D/E/F/G, one or more of layer (B), layer (C), layer (E), and layer (F) may include the same materials or different materials. In a nine-layer film designated as A/B/C/D/E/F/G/H/I, e or more of layer (B), layer (C), layer (G), and layer (H) may include the same materials or different materials.

In embodiments, at least one subskin layer may include the multimodal polyethylene composition described herein. In embodiments, the subskin layer comprising the multimodal polyethylene composition described herein may be blended with a polyethylene having a density of from 0.870 g/cm³ to 0.970 g/cm³. In embodiments, at least one subskin layer may include greater than 20% by weight of the multimodal polyethylene composition described herein, based on the total weight of the respective layer. In one or more embodiments, each subskin layer may include greater than 20% by weight of the multimodal polyethylene composition described herein, based on the total weight of the respective layer. In some embodiments, each subskin layer may include from 30 wt. % to 100 wt. %, from 50 wt. % to 80 wt. %, from 50 wt. % to 60 wt. %, from 60 wt. % to 100 wt. %, from 60 wt. % to 80 wt. %, or from 80 wt. % to 100 wt. % of the multimodal polyethylene composition described herein, based on the total weight of the respective layer.

In embodiments, each subskin layer may include an LLDPE, an HDPE, the multimodal polyethylene composition described herein, an MDPE, an LDPE, and combinations thereof. In some embodiments, subskin layers that do not comprise the multimodal polyethylene composition described herein may include a polyethylene having a density of from 0.870 g/cm³ to 0.970 g/cm³.

In one or more embodiments, each subskin layer may include a linear low density polyethylene (LLDPE) having a density from 0.905 g/cm³ to 0.930 g/cm³ when measured according to ASTM D792. In another embodiment, the density of the linear low density polyethylene may be from 0.905 g/cm³ to 0.925 g/cm³, from 0.905 g/cm³ to 0.920 g/cm³, from 0.905 g/cm³ to 0.915 g/cm³, from 0.905 g/cm³ to 0.910 g/cm³, from 0.910 g/cm³ to 0.930 g/cm³, from 0.910 g/cm³ to 0.925 g/cm³, from 0.910 g/cm³ to 0.920 g/cm³, from 0.910 g/cm³ to 0.915 g/cm³, from 0.915 g/cm³ to 0.930 g/cm³, from 0.915 g/cm³ to 0.925 g/cm³, from 0.915 g/cm³ to 0.920 g/cm³, from 0.920 g/cm³ to 0.930 g/cm³, from 0.920 g/cm³ to 0.925 g/cm³, from 0.925 g/cm³ to 0.930 g/cm³.

In one or more embodiments, each subskin layer may include a linear low density polyethylene (LLDPE) having a melt index ($I_2$) from 0.2 grams per 10 minutes (g/10 min) to 6.0 g/10 min when measured according to ASTM D1238. It is also contemplated that the melt index ($I_2$) of the linear low density polyethylene may be from 0.2 g/10 min to 5.5 g/10 min, from 0.2 g/10 min to 5.0 g/10 min, or from 0.2 g/10 min to 4.5 g/10 min, from 0.5 g/10 min to 4.0 g/10 min, from 0.5 g/10 min to 3.5 g/10 min, from 0.5 g/10 min to 3.0 g/10 min, from 1.0 g/10 min to 2.0 g/10 min from 1.0 g/10 min to 1.5 g/10 min, or from 1.5 g/10 min to 2.0 g/10 min.

According to embodiments, the linear low density polyethylene may have a molecular weight distribution, expressed as the ratio of the weight average molecular weight to number average molecular weight (Mw/Mn), in the range of from 3.5 to 5.5. In additional embodiments, the linear low density polyethylene may have a molecular weight distribution in the range from 3.5 to 4.5 or from 4.5 to 5.5.

According to one or more additional embodiments, the linear low density polyethylene may have a zero shear viscosity ratio of from 1.2 to 3.0, when measured according to the test methods described herein. In embodiments, the linear low density polyethylene may have a zero shear viscosity ratio of from 1.2 to 2.5, from 1.2 to 2.0, from 2.0 to 3.0, from 2.0 to 2.5, or from 2.5 to 3.0.

Various methodologies are contemplated for producing linear low density polyethylenes. For example, linear low density polyethylene resins may be made using Ziegler-Natta catalyst systems, resin made using single-site catalysts including, but not limited to, bis-metallocene catalysts and constrained geometry catalysts, and resin made using post-metallocene molecular catalysts. Linear low density polyethylene resins may include linear, substantially linear or heterogeneous polyethylene copolymers or homopolymers. Linear low density polyethylene resins may contain less long chain branching than LDPEs and include substantially linear polyethylenes, which are further defined in U.S. Pat. No. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. Nos. 3,914,342 or 5,854,045). Linear low density polyethylene resins may be made via gas-phase, solution-phase or slurry polymerization or any combination thereof, using any type of reactor or reactor configuration known in the art.

In one or more embodiments, each subskin layer may include from 0 wt. % to 80 wt. %, from 0 wt. % to 60 wt. %, from 0 wt. % to 40 wt. %, from 0 wt. % to 20 wt. %, from 20 wt. % to 80 wt. %, from 20 wt. % to 60 wt. %, from 20 wt. % to 40 wt. %, from 40 wt. % to 80 wt. %, from 40 wt. % to 60 wt. %, or from 60 wt. % to 80 wt. %, of LLDPE, based on the total weight of the respective layer.

In embodiments, each subksin layer may include a low density polyethylene (LDPE). In one or more embodiments, the low density polyethylene may have a melt index from 0.1 g/10 min to 10.0 g/10 min when measured according to ASTM D1238 at a load of 2.16 kg and temperature of 190° C. In embodiments, the low density polyethylene may have a melt index from 0.1 g/10 min to 5.0 g/10 min, or from 0.5 g/10 min to 5.0 g/10 min, or from 0.5 g/10 min to 2.0 g/10 min. In embodiments, the low density polyethylene may have a density of from 0.916 g/cm³ to 0.935 g/cm³ when measured according to ASTM D792. In another embodiment, the low density polyethylene may a density from 0.916 g/cm³ to 0.925 g/cm³.

In one or more embodiments, each subskin layer may include less than 50% by weight LDPE, based on the total weight of the respective layer. In some embodiments, each subskin layer may include from 0 wt. % to 50 wt. %, from 0 wt. % to 40 wt. %, from 0 wt. % to 35 wt. %, from 5 wt. % to 35 wt. %, from 10 wt. % to 35 wt. %, or from 15 wt. % to 35 wt. % LDPE, based on the total weight of the respective layer.

In one or more embodiments, each subskin layer may include an MDPE. MDPE is typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts and polyvalent aryloxyether catalysts (typically referred to as bisphenyl phenoxy). It should be noted that MDPE may be used in one or more subskin layers.

In one or more embodiments, each subskin layer may include greater than 20% by weight MDPE, based on the total weight of the respective layer. In some embodiments, each subskin layer may include from 30 wt. % to 100 wt. %, from 50 wt. % to 80 wt. %, from 50 wt. % to 60 wt. %, from 60 wt. % to 100 wt. %, from 60 wt. % to 80 wt. %, or from 80 wt. % to 100 wt. % MDPE, based on the total weight of the respective layer.

In embodiments, each subskin layer may include a high density polyethylene (HDPE) having a density from 0.935 g/cm³ and up to 0.980 g/cm³ when measured according to ASTM D792. In another embodiment, the HDPE may a density from 0.935 g/cm³ to 0.970 g/cm³, from 0.935 g/cm³ to 0.960 g/cm³, from 0.935 g/cm³ to 0.950 g/cm³, from 0.935 g/cm³ to 0.940 g/cm³, from 0.940 g/cm³ to 0.980 g/cm³, from 0.940 g/cm³ to 0.970 g/cm³, from 0.940 g/cm³ to 0.960 g/cm³, from 0.940 g/cm³ to 0.950 g/cm³, from 0.950 g/cm³ to 0.980 g/cm³, from 0.950 g/cm³ to 0.970 g/cm³, from 0.950 g/cm³ to 0.960 g/cm³, from 0.960 g/cm³ to 0.980 g/cm³, from 0.960 g/cm³ to 0.970 g/cm³, or from 0.970 g/cm³ to 0.980 g/cm³.

In one or more embodiments, each subskin layer may include an HDPE having a melt index ($I_2$) from 0.1 grams per 10 minutes (g/10 min) to 10.0 g/10 min when measured according to ASTM D1238 at a load of 2.16 kg and temperature of 190° C. It is also contemplated that the melt index ($I_2$) of the high density polyethylene may be from 0.1 g/10 min to 5.0 g/10 min, from 0.1 g/10 min to 1.0 g/10 min, or from 1.0 g/10 min to 10.0 g/10 min, from 1.0 g/10 min to 5.0 g/10 min, or from 5.0 g/10 min to 10.0 g/10 min.

Various methodologies are contemplated for producing high density polyethylene. For example, HDPE resins may be made using Ziegler-Natta catalyst systems, chrome catalysts or single-site catalysts including, but not limited to, bis-metallocene catalysts and constrained geometry catalysts.

In one or more embodiments, each subskin layer may include up to 50% by weight of HDPE, based on the total weight of the respective layer. In some embodiments, each subskin layer may include from 0 wt. % to 90 wt. %, from 15 wt. % to 80 wt. %, from 15 wt. % to 50 wt. %, from 20 wt. % to 50 wt. %, from 30 wt. % to 40 wt. %, or from 35 wt. % to 50 wt. % of HDPE, based on the total weight of the respective layer.

In embodiments, each subskin layer of the multilayer films of the present disclosure can have a variety of thicknesses. The thickness of each subskin layer may depend on a number of factors including, for example, the composition of the subskin layer, the desired overall dart and puncture properties of the multilayer film, and others. In embodiments, each subskin layer may have a thickness of from 1 micrometers 1 µm to 85 µm. In embodiments, each outer layer may have a thickness of from 1 µm to 80 µm, from 1 µm to 60 µm, from 1 µm to 40 µm, from 1 µm to 20 µm, from 20 µm to 80 µm, from 20 µm to 60 µm, from 20 µm to 40 µm, from 40 µm to 80 µm, from 40 µm to 60 µm, or from 60 µm to 80 µm.

When subskin layers are present in embodiments of the multilayer films, the thickness of each subskin layer of the multilayer films disclosed herein may make up from 5% to 40% of the total thickness of the multilayer film. In some embodiments, each subskin layer may make up from 5% to 20 wt. %, from 5% to 15%, from 5% to 10%, from 10% to 40%, from 10% to 20%, from 10% to 15%, from 15% to 40%, from 15% to 20%, or from 20% to 40% of the total thickness of the multilayer film.

Barrier Layer

In embodiments, the multilayer film may include a barrier layer. The term "barrier layer" as used herein, refers to a layer reduces vapor or gas diffusion into and out of the multilayer film. For example, a barrier layer may reduce aroma, water, or oxygen diffusion into and out of the multilayer film.

In embodiments, the barrier layer, which may include a polar material. The term "polar material," as used herein, refers to a polymer formed from at least one monomer that comprises at least one heteroatom. Some examples of heteroatoms include O, N, P and S. In various embodiments, the polar material may be selected from an ethylene vinyl alcohol polymer (EVOH) (such as Eval H171B sold by Kuraray) or a combination of EVOH and polyamide (PA) (such as Nylon 6, Nylon 66, and Nylon 6/66 sold by DuPont). In various embodiments, barrier layer consists of ethylene vinyl alcohol (EVOH). In some embodiments, the barrier layer does not include polyamide or is substantially free of polyamide. As used herein, "substantially free" may mean that the barrier layer includes less than 1 wt. % polyamide, based on the total weight of the barrier layer. In embodiments, the barrier layer may include less than 0.5 wt. % or less than 0.1 wt. % polyamide. It should be understood that in embodiments, the barrier layer including the polar material may comprise or consist of the polar material. In embodiments where the layer comprising polar material comprises polar material, the polar material may be blended with any polymer, including polyethylene, such as, for example, LLDPE, LDPE, ULDPE, MDPE, HDPE, and the multimodal polyethylene composition described herein. In various embodiments, the polar material has a melt index ($I_2$) (2.16 kg, 190° C.) from 0.1 g/10 min to 40 g/10 min, from 0.2 g/10 min to 20 g/10 min, or from 0.5 g/10 min to 10 g/10 min. In various embodiments, the polar material has a density from 1.00 g/cm$^3$ to 1.30 g/cm$^3$, or from 1.10 g/cm$^3$ to 1.20 g/cm$^3$ (1 cm$^3$=1 cc).

In embodiments, the barrier layer of the multilayer films of the present disclosure can have a variety of thicknesses. The thickness of the barrier layer may depend on a number of factors including, for example, the composition of the barrier layer, the desired overall recyclability and barrier properties of the multilayer film, and others. In embodiments, the barrier layer may have a thickness of from 0.1 µm to 20 µm, from 0.1 µm to 15 µm, from 0.1 µm to 10 µm, from 0.1 µm to 5 µm, from 0.1 µm to 1 µm, from 0.1 µm to 0.5 µm, from 0.5 µm to 20 µm, from 0.5 µm to 15 µm, from 0.5 µm to 10 µm, from 0.5 µm to 5 µm, from 0.5 µm to 1 µm, from 1 µm to 20 µm, from 1 µm to 15 µm, from 1 µm to 10 µm, from 1 µm to 5 µm, from 5 µm to 20 µm, from 5 µm to 15 µm, from 5 µm to 10 µm, from 10 µm to 20 µm, from 10 µm to 15 µm, or from 15 µm to 20 µm.

The thickness of the barrier layer of the multilayer films disclosed herein may make up from 1% to 10%, from 1% to 8%, from 1% to 6%, from 1% to 4%, from 1% to 2%, from 2% to 10%, from 2% to 8%, from 2% to 6%, from 2% to 4%, from 4% to 10%, from 4% to 8%, from 4% to 6%, from 6% to 10%, from 6% to 8%, or from 8% to 10% of the total thickness of the multilayer film.

Tie Layers

In embodiments, the multilayer film may include one or more tie layers. The term "tie layer" as used herein, refers to a layer that adheres two layers together. For example a tie layer may bond polar materials to one or more layers that do not include polar materials. For instance, a tie layer may be placed adjacent to a layer comprising a polar material to adhere the layer comprising the polar material to a layer comprising polyethylene. In embodiments, a tie layer may be placed adjacent to the barrier layer to adhere the barrier layer, comprising the polar material, to one or more layers including polyethylene, such as one or more subskin layers or outer layers.

In embodiments, a wide variety of polymers known to those of skill in the art as being useful for adhering a layer comprising polar material (such as, for example, EVOH or polyamide) to layers including polyethylene can be used for the tie layers, based on the teachings herein.

In embodiments, tie layers may include ethylene and acid copolymers. In one or more embodiments, the tie layers may include an anhydride-grafted ethylene/alpha-olefin interpolymer. The term, "anhydride-grafted ethylene/alpha-olefin interpolymer," as used herein, refers to an ethylene/alpha-olefin interpolymer that comprises at least one anhydride group linked by a covalent bond. The anhydride-grafted ethylene/alpha-olefin interpolymer may be an ethylene-based polymer with an anhydride grafting monomer grafted thereto. Suitable ethylene-based polymers for the low-melt viscosity maleic anhydride-grafted polyolefin include, without limitation, polyethylene homopolymers and copolymers with α-olefins, copolymers of ethylene and vinyl acetate, and copolymers of ethylene and one or more alkyl (meth) acrylates. In specific embodiments, the anhydride-grafted ethylene/alpha-olefin interpolymer may comprise a maleic anhydride-grafted linear low density polyethylene (LLDPE).

In one or more embodiments, the anhydride-grafted ethylene/alpha-olefin interpolymer comprises up to 10 wt. %, up to 5 wt. %, or from 1 to 4 wt. % of the maleic anhydride grafting monomer, based on the total weight of the anhydride-grafted ethylene/alpha-olefin interpolymer. The weight percentage of the ethylene-based polymer is complementary to the amount of maleic anhydride grafting monomer, so that the sum of the weight percentages of the ethylene-based polymer and the maleic anhydride-grafted monomer is 100 wt. %. Thus, the anhydride-grafted ethylene/alpha-olefin interpolymer comprises up to 90 wt. %, up to 95 wt. %, or from 96 to 99 wt. %, based on the total weight of the maleic anhydride-grafted polyolefin, of the ethylene-based polymer.

Examples of anhydride grafting moieties may include but are not limited to, maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, bicyclo(2.2.2)oct-5-ene-2,3-dicarboxylic acid anhydride, lo-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, tetrahydrophtalic anhydride, norbom-5-ene-2,3-dicarboxylic acid anhydride, nadic anhydride, methyl nadic anhydride, himic anhydride, methyl himic anhydride, and x-methyl-bi-cyclo(2.2.1)hept-5-ene-2,3-dicarboxylic acid anhydride. In one embodiment, the anhydride grafting moiety comprises maleic anhydride.

In further embodiments, the anhydride-grafted ethylene/alpha-olefin interpolymer has a density less than 0.940 grams per cubic centimeter ($g/cm^3$), or from 0.855 $g/cm^3$ to 0.940 $g/cm^3$, as measured according to ASTM Method No. D792-91. Other density ranges may be from 0.855 $g/cm^3$ to 0.900 $g/cm^3$, from 0.855 $g/cm^3$ to 0.880 $g/cm^3$, from 0.855 $g/cm^3$ to 0.860 $g/cm^3$, from 0.860 $g/cm^3$ to 0.940 $g/cm^3$, from 0.860 $g/cm^3$ to 0.910 $g/cm^3$, from 0.860 $g/cm^3$ to 0.880 $g/cm^3$, from 0.880 $g/cm^3$ to 0.910 $g/cm^3$, or from 0.880 $g/cm^3$ to 0.900 $g/cm^3$.

In one or more embodiments, the anhydride-grafted ethylene/alpha-olefin interpolymer may have a melt index ($I_2$) of 300 grams per 10 minutes (g/10 min) to 1500 g/10 min, or from 300 g/10 min to 1000 g/10 min, from 500 g/10 min to 800 g/10 min, from 500 g/10 min to 600 g/10 min, from 600 g/10 min to 1000 g/10 min, from 600 g/10 min to 800 g/10 min, or from 800 g/10 min to 1000 g/10 min as determined in accordance with ASTM method D1238 at 190° C. and 2.16 kg.

In one or more embodiments, the anhydride-grafted ethylene/alpha-olefin interpolymer may have a melt viscosity of less than 200,000 cP when measured at 177° C. according to the test methods described subsequently in this disclosure. In embodiments, the anhydride-grafted ethylene/alpha-olefin interpolymer may have a melt viscosity of from 2,000 cP to 200,000 cP, from 2,000 cP to 100,000 cP, from 2,000 cP to 50,000 cP, from 2,000 cP to 10,000 cP, from 10,000 cP to 200,000 cP, from 10,000 cP to 100,000 cP, from 10,000 cP to 50,000 cP, from 50,000 cP to 200,000 cP, from 50,000 cP to 100,000 cP, or from 100,000 cP to 200,000 cP when measured at 177° C. according to the test methods described subsequently in this disclosure.

Various commercial embodiments are considered suitable. For example, suitable anhydride-grafted ethylene/alpha-olefin interpolymers may be commercially available from The Dow Chemical Company under the trademark BYNEL® 41E710.

Various amounts of the ethylene and acid copolymer or anhydride-grafted ethylene/alpha-olefin interpolymer are contemplated as suitable within tie layers of the multilayer films described herein. In some embodiments, the tie layer may include from 20 wt. % or less ethylene and acid copolymer or anhydride-grafted ethylene/alpha-olefin interpolymer, based on the total weight of the tie layer. In embodiments, the tie layer may include from 5 wt. % to 15 wt. %, or from 10 wt. % to 15 wt. % ethylene and acid copolymer or anhydride-grafted ethylene/alpha-olefin interpolymer, based on the total weight of the tie layer. The remainder of the tie layer may be a polyethylene, such as an LDPE, HDPE, MDPE, or the multimodal polyethylene composition described herein.

Without being bound by theory, it is believed that the anhydride-grafted ethylene/alpha-olefin interpolymer may be placed adjacent to a layer comprising polar material to bind the layer comprising polar material to a non-polar layer. In embodiments, a tie layer may be placed in direct contact with a layer comprising polar material. In embodiments, a tie layer may be placed between, and in direct contact with, a layer comprising polar material and a layer comprising the multimodal polyethylene composition described herein.

In embodiments, each tie layer of the multilayer films of the present disclosure can have a variety of thicknesses. The thickness of each tie layer may depend on a number of factors including, for example, the adhesion properties of the tie layer. In embodiments, each tie layer may have a thickness of from 0.1 µm to 20 µm. In embodiments, each tie layer may have a thickness of from 0.1 µm to 15 µm, from 0.1 µm to 10 µm, from 0.1 µm to 5 µm, from 0.1 µm to 1 µm, from 0.1 µm to 0.5 µm, from 0.5 µm to 20 µm, from 0.5 µm to 15 µm, from 0.5 µm to 10 µm, from 0.5 µm to 5 µm, from 0.5 µm to 1 µm, from 1 µm to 20 µm, from 1 µm to 15 µm, from 1 µm to 10 µm, from 1 µm to 5 µm, from 5 µm to 20 µm, from 5 µm to 15 µm, from 5 µm to 10 µm, from 10 µm to 20 µm, from 10 µm to 15 µm, or from 15 µm to 20 µm.

The thickness of each tie layer of the multilayer films disclosed herein may make up from from 1% to 10%, from 1% to 8%, from 1% to 6%, from 1% to 4%, from 1% to 2%, from 2% to 10%, from 2% to 8%, from 2% to 6%, from 2% to 4%, from 4% to 10%, from 4% to 8%, from 4% to 6%, from 6% to 10%, from 6% to 8%, or from 8% to 10% of the total thickness of the multilayer film.

Methods of Producing the Presently-Described Films

Various methodologies are contemplated for producing the multilayer films. In one or more embodiments, the process of manufacturing the multilayer film may include cast film extrusion or blown film extrusion.

In some embodiments, the process of manufacturing the multilayer film may include forming a blown film bubble. In some embodiments, the blown film bubble may be a multilayer blown film bubble. Further in accordance with this embodiment, the multilayer blown film bubble may include at least two, three, five, seven, nine, or more layers, and the layers may adhere to each other.

During embodiments of the blown film process, an extruded film from an extruder die may be formed (blown) and pulled up a tower onto a nip. The film may then be wound onto a core. Before the film is wound onto the core, the ends of the film may be cut and folded using folding equipment. This may make the layers of the film difficult to separate, which may be important for shipping applications, generally, or heavy duty shipping sack applications.

In further embodiments, the blown film bubble may be formed via a blown film extrusion line having a length to diameter ("L/D") ratio of from 30 to 1. In some embodiments, the extrusion line may have a blow up ratio of from 1 to 5, from 1 to 3, from 2 to 5, or from 2 to 3. In some embodiments, the extrusion line may utilize a die with internal bubble cooling. In some embodiments, the die gap may be from 1 millimeter (mm) to 5 mm, from 1 mm to 3 mm, from 2 mm to 5 mm, or from 2 mm to 3 mm.

In some embodiments, the extrusion line may utilize a film thickness gauge scanner. In some embodiments, during the extrusion process, the multilayer film thickness may be maintained at from 15 μm or to 115 μm. In embodiments, the multilayer film thickness may be maintained at from 15 μm to 100 μm, from 15 μm to 75 μm, from 15 μm to 50 μm, from 15 μm to 25 μm, from 25 μm to 115 μm, from 25 μm to 100 μm, from 25 μm to 75 μm, from 25 μm to 50 μm, from 50 μm to 115 μm, from 50 μm to 100 μm, from 50 μm to 75 μm, from 75 μm to 115 μm, from 75 μm to 100 μm, or from 100 μm to 115 μm.

In some embodiments, the forming of the multilayer blown film bubble step may occur at a temperature of from 350 to 500° F., or from 375 to 475° F. The output speed may be from 5 lb/hr/in to 25 lb/hr/in, from 5 lb/hr/in to 20 lb/hr/in, from 5 lb/hr/in to 15 lb/hr/in, from 5 lb/hr/in to 10 lb/hr/in, from 10 lb/hr/in to 25 lb/hr/in, from 10 lb/hr/in to 20 lb/hr/in, from 10 lb/hr/in to 15 lb/hr/in, from 15 lb/hr/in to 25 lb/hr/in, from 15 lb/hr/in to 20 lb/hr/in, or from 20 lb/hr/in to 25 lb/hr/in.

Articles

Embodiments of the present disclosure also relate to articles, such as packages, formed from the multilayer films of the present disclosure. Such packages can be formed from any of the multilayer films of the present disclosure described herein. Multilayer films of the present disclosure are particularly useful in articles where good puncture properties are desired.

Examples of such articles can include flexible packages, pouches, stand-up pouches, and pre-made packages or pouches.

Various methods of producing embodiments of articles from the multilayer films disclosed herein would be familiar to one of ordinary skill in the art.

Test Methods

The test methods include the following:

Melt Index

Melt indices 12 (or 12) and $I_{10}$ (or I10) of polymer samples were measured in accordance to ASTM D-1238 (method B) at 190° C. and at 2.16 kg and 10 kg load, respectively. Their values are reported in g/10 min. Fractions of polymer samples were measured by collecting product polymer from the reactor which produces that specific fraction or portion of the polymer composition. For example, the first polyethylene fraction can be collected from the reactor producing the lower density, higher molecular weight component of the polymer composition. The polymer solution is dried under vacuum before the melt index measurement.

Density

Samples for density measurement were prepared according to ASTM D4703. Measurements were made, according to ASTM D792, Method B, within one hour of sample pressing.

ASTM D1709 Dart Drop

The film Dart Drop test determines the energy that causes plastic film to fail under specified conditions of impact by a free falling dart. The test result is the energy, expressed in terms of the weight of the missile falling from a specified height, which would result in failure of 50% of the specimens tested.

After the film is produce, it is conditioned for at least 40 hours at 23° C. (+/−2° C.) and 50% R.H (+/−5) as per ASTM standards. Standard testing conditions are 23° C. (+/−2° C.) and 50% R.H (+/−5) as per ASTM standards.

The test result is reported by Method B, which uses a 2" diameter dart head and 60" drop height. The sample thickness is measured at the sample center and the sample then clamped by an annular specimen holder with an inside diameter of 5 inches. The dart is loaded above the center of the sample and released by either a pneumatic or electromagnetic mechanism.

Testing is carried out according to the 'staircase' method. If the sample fails, a new sample is tested with the weight of the dart reduced by a known and fixed amount. If the sample does not fail, a new sample is tested with the weight of the dart increased by a known amount. After 20 specimens have been tested the number of failures is determined. If this number is 10 then the test is complete. If the number is less than 10 then the testing continues until 10 failures have been recorded. If the number is greater than 10, testing is continued until the total of non-failures is 10. The Dart drop strength is determined from these data as per ASTM D1709 and expressed in grams as the dart drop impact of Type B.

Instrumented Dart Impact

Instrumented dart impact method is measured according to ASTM D7192 on plastic film specimens using an Instron CEAST 9350 impact tester. The test is conducted using 12.7 mm diameter tup with hemispherical head, 75 mm diameter clamping assembly with rubber faced grips. The instrument is equipped with an environmental chamber for testing at low or high temperature. Typical specimen size is 125 mm×125 mm. Standard test velocity is 200 m/min. Film thickness is 2 mil.

Creep Zero Shear Viscosity Measurement Method

Zero-shear viscosities are obtained via creep tests that were conducted on an AR-G2 stress controlled rheometer (TA Instruments; New Castle, Del) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ $s^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Gel Permeation Chromatography (GPC)

The chromatographic system consisted of a PolymerChar GPC-IR (Valencia, Spain) high temperature GPC chromatograph equipped with an internal IRS infra-red detector (IRS). The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)).:

$$M_{polyethylene} = A \times (M_{polystyrene})^B \quad \text{(EQ. 1)}$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects such that linear homopolymer polyethylene standard is obtained at 120,000 Mw.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\ Max})}{\text{Peak Width at } \frac{1}{2} \text{ height}} \right)^2 \quad \text{(EQ 2)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad \text{(EQ 3)}$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IRS detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i / M_{polyethylene_i})} \quad \text{(EQ 4)}$$

$$Mw_{(GPC)} = \frac{\sum_i (IR_i * M_{polyethylene_i})}{\sum_i IR_i} \quad \text{(EQ 5)}$$

$$Mz_{(GPC)} = \frac{\sum_i (IR_i * M_{polyethylene_i}^2)}{\sum_i (IR_i * M_{polyethylene_i})} \quad \text{(EQ 6)}$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−0.5% of the nominal flowrate.

Flowrate(effective)=Flowrate(nominal)*(RV(FM Calibrated)/RV(FM Sample))     (EQ 7)

Improved Method for Comonomer Content Analysis (iCCD)

Improved method for comonomer content analysis (iCCD) was developed in 2015 (Cong and Parrott et al., WO2017040127A1). iCCD test was performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 5 cm or 10 cm (length)×¼" (ID) stainless was installed just before IR-5 detector in the detector oven. Ortho-dichlorobenzene (ODCB, 99% anhydrous grade or technical grade) was used. Silica gel 40 (particle size 0.2~0.5 mm, catalogue number 10181-3) from EMD Chemicals was obtained (can be used to dry ODCB solvent before). The CEF instrument is equipped with an autosampler with N2 purging capability. ODCB is sparged with dried nitrogen (N2) for one hour before use. Sample preparation was done with autosampler at 4 mg/ml (unless otherwise specified) under shaking at 160° C. for 1 hour. The injection volume was 300 μl. The temperature profile of iCCD was: crystallization at 3° C./min from 105° C. to 30° C., the thermal equilibrium at 30° C. for 2 minute (including Soluble Fraction Elution Time being set as 2 minutes), elution at 3° C./min from 30° C. to 140° C. The flow rate during crystallization is 0.0 ml/min. The flow rate during elution is 0.50 ml/min. The data was collected at one data point/second.

The iCCD column was packed with gold coated nickel particles (Bright 7GNM8-NiS, Nippon Chemical Industrial Co.) in a 15 cm (length)×¼" (ID) stainless tubing. The column packing and conditioning were with a slurry method according to the reference (Cong, R.; Parrott, A.; Hollis, C.; Cheatham, M. WO2017040127A1). The final pressure with TCB slurry packing was 150 Bars.

Column temperature calibration was performed by using a mixture of the Reference Material Linear homopolymer polyethylene (having zero comonomer content, Melt index ($I_2$) of 1.0, polydispersity $M_w/M_n$ approximately 2.6 by conventional gel permeation chromatography, 1.0 mg/ml) and Eicosane (2 mg/ml) in ODCB. iCCD temperature calibration consisted of four steps: (1) Calculating the delay volume defined as the temperature offset between the measured peak elution temperature of Eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed same way as specified previously at 4 mg/mL. The reported elution peak temperatures were linearly fit to the linear equation y=−6.3515x.+101.00, where y represented elution temperature of iCCD and x represented the octene mole %, and $R^2$ was 0.978.

Molecular weight of polymer and the molecular weight of the polymer fractions was determined directly from LS detector (90 degree angle) and concentration detector (IR-5) according Rayleigh-Gans-Debys approximation (Striegel and Yau, Modern Size Exclusion Liquid Chromatogram, Page 242 and Page 263) by assuming the form factor of 1 and all the virial coefficients equal to zero. Integration windows are set to integrate all the chromatograms in the elution temperature (temperature calibration is specified above) range from 23.0 to 120° C.

The calculation of Molecular Weight (Mw) from iCCD includes the following four steps:

(1) Measuring the interdetector offset. The offset is defined as the geometric volume offset between LS with respect to concentration detector. It is calculated as the difference in the elution volume (mL) of polymer peak between concentration detector and LS chromatograms. It is converted to the temperature offset by using elution thermal rate and elution flow rate. A linear high density polyethylene (having zero comonomer content, Melt index ($I_2$) of 1.0, polydispersity $M_w/M_n$ approximately 2.6 by conventional gel permeation chromatography) is used. Same experimental conditions as the normal iCCD method above are used except the following parameters: crystallization at 10° C./min from 140° C. to 137° C., the thermal equilibrium at 137° C. for 1 minute as Soluble Fraction Elution Time, soluble fraction (SF) time of 7 minutes, elution at 3° C./min from 137° C. to 142° C. The flow rate during crystallization is 0.0 ml/min. The flow rate during elution is 0.80 ml/min. Sample concentration is 1.0 mg/ml.

(2) Each LS datapoint in LS chromatogram is shifted to correct for the interdetector offset before integration.

(3) Baseline subtracted LS and concentration chromatograms are integrated for the whole eluting temperature range of the Step (1). The MW detector constant is calculated by using a known MW HDPE sample in the range of 100,000 to 140,000 Mw and the area ratio of the LS and concentration integrated signals.

(4) Mw of the polymer was calculated by using the ratio of integrated light scattering detector (90 degree angle) to the concentration detector and using the MW detector constant.

Calculation of half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C.

Zero-Shear Viscosity Ratio (ZSVR)

ZSVR is defined as the ratio of the zero-shear viscosity (ZSV) of the branched polyethylene material to the ZSV of the linear polyethylene material at the equivalent weight average molecular weight (Mw-gpc) according to the following Equations (EQ) 8 and 9:

$$ZSVR = \frac{\eta_{0B}}{\eta_{0L}} \quad (EQ\ 8)$$

$$\eta_{0L} = 2.29 \times 10^{-15} M_{w-gpc}^{3.65} \quad (EQ\ 9)$$

The ZSV value is obtained from creep test at 190° C. via the method described above. The Mw-gpc value is determined by the conventional GPC method (Equation 5 in the Conventional GPC method description). The correlation between ZSV of linear polyethylene and its Mw-gpc was established based on a series of linear polyethylene reference materials. A description for the ZSV-Mw relationship can be found in the ANTEC proceeding: Karjala, Teresa P., Sammler, Robert L., Mangnus, Marc A., Hazlitt, Lonnie G., Johnson, Mark S., Hagen, Charles M. Jr., Huang, Joe W. L., Reichek, Kenneth N., "Detection of low levels of long-chain branching in polyolefins", Annual Technical Conference—Society of Plastics Engineers (2008), 66th 887-891.

MD Tear

MD Tear was measured according to ASTM D-1922. The force in grams required to propagate tearing across a film specimen is measured using a Elmendorf Tear tester. Acting by gravity, the pendulum swings through an arc, tearing the specimen from a precut slit. The tear is propagated in the cross direction. Samples are conditioned for a minimum of 40 hours at temperature prior to testing Dynamic Rheological Analysis To characterize the rheological behavior of substantially linear ethylene polymers, S Lai and G. W. Knight introduced (ANTEC '93 Proceedings, Insite (TM) Technology Polyolefins (ITP)-New Rules in the Structure/Rheology Relationship of Ethylene &-Olefin Copolymers, New Orleans, La., May 1993) a new rheological measurement, the Dow Rheology Index (DRI) which expresses a polymer's "normalized relaxation time as the result of long chain branching". S. Lai et al; (ANTEC '94, Dow Rheology Index (DRI) for Insite(TM) Technology Polyolefins (ITP): Unique structure-Processing Relationships, pp. 1814-1815) defined the DRI as the extent to which the rheology of ethylene-octene copolymers known as ITP (Dow's Insite Technology Polyolefins) incorporating long chain branches into the polymer backbone deviates from the rheology of the conventional linear homogeneous polyolefins that are reported to have no Long Chain Branches (LCB) by the following normalized equation:

$$DRI=[3650000 \times (\tau_0/\eta_0)-1]/10 \quad (EQ\ 10)$$

wherein $\tau_0$ is the characteristic relaxation time of the material and is the zero shear rate complex viscosity of the material. The DRI is calculated by least squares fit of the rheological curve (dynamic complex viscosity $\eta^*(\omega)$ versus applied frequency ($\omega$) e.g., 0.01-100 rads/s) as described in U.S. Pat. No. 6,114,486 with the following generalized Cross equation, i.e.

$$\eta^*(\omega)=\eta_0/[1+(\omega \cdot \tau_0)^n] \quad (EQ\ 11)$$

wherein n is the power law index of the material, $\eta^*(\omega)$ and $\omega$ are the measured complex viscosity and applied frequency data respectively.

Dynamic rheological measurements are carried out, according to ASTM D4440, on a dynamic rheometer (e.g., ARES rheometer by TA Instruments) with 25 mm diameter parallel plates in a dynamic mode under an inert atmosphere. For all experiments, the rheometer has been thermally stable at 190° C. for at least 30 minutes before inserting the appropriately stabilized (with anti-oxidant additives), compression-moulded sample onto the parallel plates. The plates are then closed with a positive normal force registered on the meter to ensure good contact. After approximately 5 minutes at 190° C., the plates are lightly compressed and the surplus polymer at the circumference of the plates is trimmed. A further 10 minutes is allowed for thermal stability and for the normal force to decrease back to zero. That is, all measurements are carried out after the samples have been equilibrated at 190° C. for approximately 15 minutes and are run under full nitrogen blanketing.

Two strain sweep (SS) experiments are initially carried out at 190° C. to determine the linear viscoelastic strain that would generate a torque signal which is greater than 10% of the lower scale of the transducer, over the full frequency (e.g. 0.01 to 100 rad/s) range. The first SS experiment is carried out with a low applied frequency of 0.1 rad/s. This test is used to determine the sensitivity of the torque at low frequency. The second SS experiment is carried out with a high applied frequency of 100 rad/s. This is to ensure that the selected applied strain is well within the linear viscoelastic region of the polymer so that the oscillatory rheological measurements do not induce structural changes to the polymer during testing. In addition, a time sweep (TS) experiment is carried out with a low applied frequency of 0.1 rad/s at the selected strain (as determined by the SS experiments) to check the stability of the sample during testing.

The values of storage (or elastic) modulus, loss (or viscous) modulus (G"), complex modulus (G*), complex viscosity ($\eta^*$) and tan $\delta$ (the ratio of loss modulus and storage modulus, G"/G') were obtained as a function of frequency ($\omega$) at a given temperature (e.g., 190° C.).

ASTM D1922 MD (Machine Direction) and CD (Cross Direction) Elmendorf Tear Type B The Elmendorf Tear test determines the average force to propagate tearing through a specified length of plastic film or non-rigid sheeting, after the tear has been started, using an Elmendorf-type tearing tester.

After film production from the sample to be tested, the film was conditioned for at least 40 hours at 23° C. (+/−2° C.) and 50% R.H (+/−5) as per ASTM standards. Standard testing conditions were 23° C. (+/−2° C.) and 50% R.H (+/−5) as per ASTM standards.

The force, in grams, required to propagate tearing across a film or sheeting specimen was measured, using a precisely calibrated pendulum device. In the test, acting by gravity, the pendulum swung through an arc, tearing the specimen from a precut slit. The specimen was held on one side by the pendulum, and on the other side by a stationary member. The loss in energy by the pendulum was indicated by a pointer or by an electronic scale. The scale indication was a function of the force required to tear the specimen.

The sample specimen geometry used in the Elmendorf tear test was the 'constant radius geometry,' as specified in ASTM D1922. Testing is typically carried out on specimens that have been cut from both the film MD and CD directions. Prior to testing, the film specimen thickness was measured at the sample center. A total of 15 specimens per film direction were tested, and the average tear strength and average thickness reported. The average tear strength was normalized to the average thickness.

ASTM D882 MD and CD, 1% and 2% Secant Modulus

The film MD (Machine Direction) and CD (Cross Direction) secant modulus was determined per ASTM D882. The reported secant modulus value was the average of five measurements.

Puncture Strength

The Puncture test determines the resistance of a film to the penetration of a probe, at a standard low rate, a single test velocity. The puncture test method is based on ASTM D5748. After film production, the film was conditioned for at least 40 hours at 23° C. (+/−2° C.) and 50% R.H (+/−5), as per ASTM standards. Standard testing conditions are 23° C. (+/−2° C.) and 50% R.H (+/−5) as per ASTM standards. Puncture was measured on a tensile testing machine. Square specimens were cut from a sheet, to a size of "6 inches by 6 inches." The specimen was clamped in a "4 inch diameter" circular specimen holder, and a puncture probe was pushed into the center of the clamped film, at a cross head speed of 10 inches/minute. The internal test method follows ASTM D5748, with one modification. It deviated from the ASTM D5748 method, in that the probe used, was a "0.5 inch diameter" polished steel ball on a "0.25 inch" support rod (rather than the 0.75 inch diameter, pear shaped probe specified in D5748).

There was a "7.7 inch" maximum travel length to prevent damage to the test fixture. There was no gauge length; prior to testing, the probe was as close as possible to, but not touching the specimen. A single thickness measurement was made in the center of the specimen. For each specimen, the maximum force, the force at break, the penetration distance, and the energy to break were determined. A total of five specimens were tested to determine an average puncture value. The puncture probe was cleaned using a "Kim-wipe" after each specimen.

EXAMPLES

The following examples illustrate features of the present disclosure but are not intended to limit the scope of the disclosure. The following experiments analyzed the performance of embodiments of the multimodal polyethylene compositions described herein.

Example 1: Preparation of Multimodal Polyethylene Compositions 1

Multimodal Polyethylene Composition 1, which is described according to the one or more embodiments of the detailed description, was prepared by a method that utilized the catalysts and reactors described below.

Figure 2:
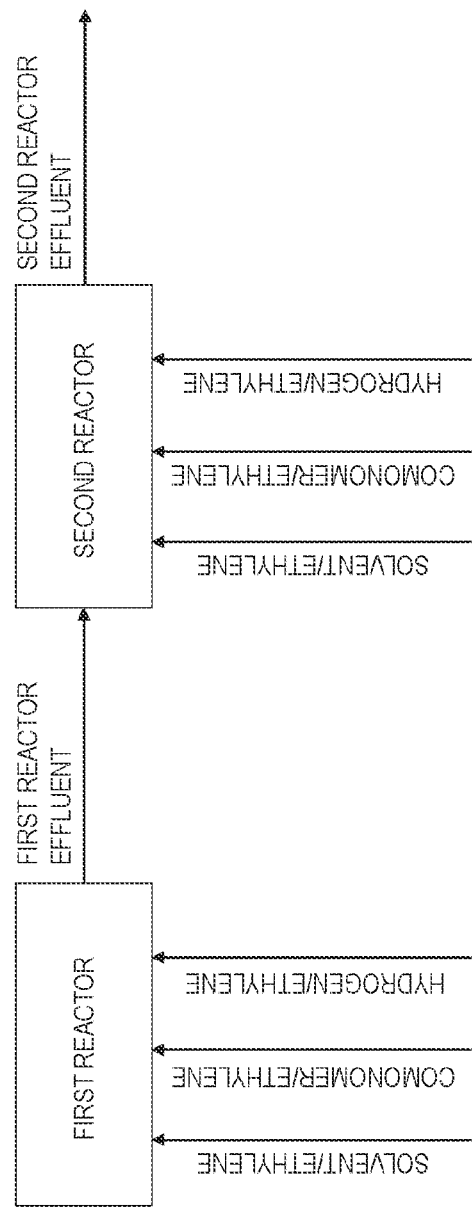
FIG. 2 schematically depicts a reactor system useful for producing polyethylene compositions, according to one or more embodiments presently described.

An ethylene-1-octene bimodal copolymer sample was produced using a liquid full solution polymerization process in a series dual reactor configuration, such as the one depicted in FIG. 2. For production of this sample, the first reactor was a continuously stirred tank reactor (CSTR) and the second reactor was a loop reactor (LR). Each reactor feed comprised recycle solvent (consisting of Isopar E, ethylene, 1-octene, and hydrogen) as well as fresh ethylene, 1-octene, and hydrogen. Recycle solvent, ethylene, and 1-octene were measured using industry standard coriolis meter technology and hydrogen flow was measured using an industry standard thermal mass flow meter. Industry standard rising stem plug valves were used to control the flow of each reactor feed component. A proprietary digital control system (DCS) automatically manipulated the position of each rising stem plug valve to control the mass flow of each reactant at its targeted value.

Recycle solvent pressure was delivered to each reactor using a single, industry standard positive displacement pump technology. The recycle solvent flow to each reactor was metered to maintain the Isopar E to polymer production ratio noted in the table below. Ethylene pressure was delivered using industry standard gas compressor technology. A single compressor was used to supply the ethylene feed to both reactors. Ethylene to each reactor was metered to maintain the Isopar E to ethylene ratio noted in the table below. Ethylene was combined with the recycle solvent downstream of both the recycle solvent flow meter and the 1-octene feed injection location. 1-Octene pressure was delivered using an industry standard positive displacement pump technology. The 1-octene flow to the reactor system was metered to maintain the 1-octene to ethylene ratio noted in Table 1 below. The entire 1-octene reactor system feed was injected into the first reactor feed downstream of the recycle solvent metering system. Fresh 1-octene was not injected with the second reactor feed. The hydrogen supply pressure was delivered from 1,500 psig gas cylinders. The hydrogen to production ratio target for each reactor was automatically manipulated by the DCS to keep the respective reactor solution viscosity at target. The hydrogen to production ratio target was converted to hydrogen flow and the DCS manipulated the rising stem plug valve position to control the flow at the targeted value. The hydrogen to production ratio and solution viscosity targets for each reactor are noted in the table below. Hydrogen was combined with the ethylene gas downstream of the ethylene flow controller. For the first reactor, the combined gas stream was mixed with the combined liquid stream downstream of the 1-octene injection point into the recycle solvent and for the second reactor the combined gas stream was combined with the liquid stream downstream of the recycle solvent flow controller.

The combined feed streams for each reactor were routed through separate heat exchanger systems to cool the stream to the target feed temperatures noted in the table below. From the heat exchanger systems flow was directed to each reactor where they were injected into the polymerization liquor. The feed pressure was not directly controlled. The control point was the reactor pressure. Therefore, the measured feed pressure was a result of the pressure drop in the feed system for the given total flow rate.

The pressure required to inject each of the catalyst components into each reactor was delivered using industry standard positive displacement pump technology. The flow was measured using coriolis meters. Each component was separately pumped and metered. The catalyst complex was injected into the reactor separately from the cocatalysts. Cocatalyst 2 (MMAO) was combined with Cocatalyst 1 downstream of the Cocatalyst 1 flow meter and the combined stream was injected into the reactor through a second injector. As a result of this configuration, the catalyst complex for each reactor was activated in the polymerization solution.

The flow of catalyst complex to each reactor was manipulated by the DCS to control the ethylene conversion at the value noted in Table 1 below. The Cocatalyst 1 and Cocatalyst 2 flows were manipulated to maintain a constant molar ratio of each component to the catalyst and those values are also noted in the table. As a result, controlling the target cocatalyst to catalyst ratios resulted in the automatic adjustment of each component flow for each adjustment of catalyst complex flow. 1-Octene conversion was not directly controlled. Instead, it was it resulted from the selected catalyst complex and its relative reactivity of ethylene to 1-octene for the ethylene conversion set point and the selected reactor temperature as noted in the table. In addition to the recycle and fresh feed injected into the second reactor, there was unreacted ethylene, 1-octene, and hydrogen in the first reactor effluent injected into the second reactor.

The solution viscosity was not directly measured. Instead the frictional pressure loss was measured and the Fanning equation was used to calculate the viscosity of the polymer solution. To calculate viscosity the pipe dimensions, total mass flow, density, and pressure drop across the pipe of known dimensions (inside diameter, surface roughness, and length) must be known. An industry standard coriolis meter was used to measure both the mass flow and density of the reactor effluent. An industry standard diaphragm style differential pressure transmitter was used to measure the pressure drop across the pipe of known dimensions. The viscosity was then calculated by inserting these measurements into the Fanning equation rearranged to solve for viscosity according to the following equations:

$$dP = 4f\rho \frac{L}{D}\frac{v^2}{2gc144} \quad (12)$$

$$f = \frac{16}{Re} \quad (13)$$

$$Re = \frac{\rho D v}{\mu} \quad (14)$$

$$\mu(lbsm/ft-s) = \frac{288 dP gcv D^2}{64 L v^2} \quad (15)$$

where $\mu$=viscosity (lbsm/ft-s), dP=frictional pressure drop (psi), D=pipe inside diameter (ft), f=Fanning friction factor, $\rho$=density (lbs/ft$^3$), v=velocity (ft/s), L=pipe length (ft), and gc=unit conversion (lbsm-ft/lbsf-s2).

For each reactor, the DCS manipulated the hydrogen to production ratio and converted this to a hydrogen flow target to control the solution viscosity at the targets noted in Table 1.

Multimodal Polyethylene Composition 1 was made using a bis-biphenylphenoxy catalyst as described hereinabove. The bis-biphenylphenoxy catalyst complex with the structure described and shown above may be activated by combination with one or more cocatalysts, for example, a cation forming cocatalyst, a strong Lewis acid, or a combination. Suitable activating cocatalysts include polymeric or oligomeric aluminoxanes, especially methyl aluminoxane, as well as inert, compatible, noncoordinating, ion forming compounds. Exemplary suitable cocatalysts include, but are not limited to: modified methyl aluminoxane (MMAO), bis(hydrogenated tallow alkyl)methyl tetrakis(pentafluorophenyl)borate(1<->)amine (i.e. [HNMe(C$_{18}$H$_{37}$)$_2$][B(C$_6$F$_5$)$_4$]), and combinations of both.

Two different catalyst complexes from the bis-biphenylphenoxy family were used to produce Multimodal Polyethylene Composition 1. Catalyst A was used to make the first reactor fraction while Catalyst B was used to produce the second reactor fraction. Both catalysts contained a hafnium metal center (M) and the structures are shown as follows.

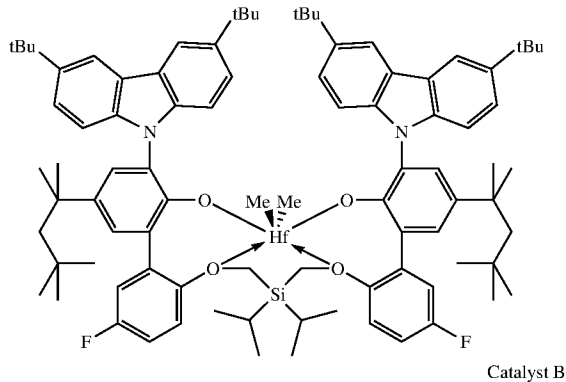

Catalyst A

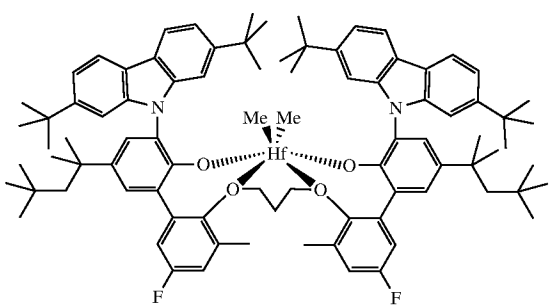

Catalyst B

The catalysts were activated by contacting the metal-ligand complex with the bis(hydrogenated tallow alkyl) methyl tetrakis(pentafluorophenyeborate(1<->)amine (Cocatalyst 1) and MMAO (Cocatalyst 2) activating cocatalysts and their structures are shown as follows:

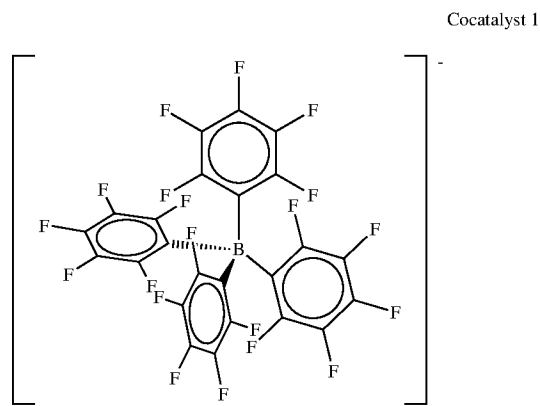

Cocatalyst 1

R$_2$MeNH$^+$ (R = hydrogenated tallow alkyl)

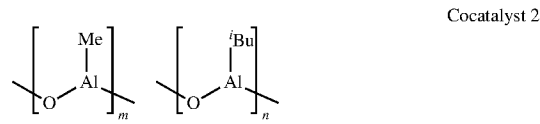

Cocatalyst 2

For the first reactor, the exothermic heat of polymerization was removed through the adiabatic temperature rise of the solvent and reactants from feed to reactor temperature. For the second reactor a portion of the heat was also removed through the adiabatic temperature rise of the reactants and solvent from feed to reactor temperature. The remaining heat of polymerization was nonadiabatically removed from the second reactor using heat exchangers within the loop reactor. The target temperatures for each reactor are noted in the table below.

The polymer split is defined as the weight percent of polymer produced in each reactor. The polymer split was not directly controlled while making Multimodal Polyethylene Composition 1. Instead, the target polymer split was achieved by controlling the feed rate of reactants and the ethylene conversion for each reactor at the targets noted in Table 1. Together with the selected catalyst complex and its reactivity ratio of ethylene to 1-octene these will dictate the amount of polymer produced and the density of that fraction.

Minor adjustments to the 1-octene to ethylene ratio were made to ensure the overall polymer density was at the target noted in the table below. To reduce the polymer density, the 1-octene to ethylene ratio was increased which yielded a greater 1-octene flow to the reactor. To increase the polymer density the 1-octene to ethylene ratio was decreased which resulted in a lower 1-octene flow to the reactor.

As stated earlier, the polymer viscosity was controlled by manipulating the hydrogen to polymer production ratio. To reduce the polymer viscosity, the hydrogen to polymer ratio was increased yielding a greater hydrogen flow to the reactor. To increase the polymer viscosity the hydrogen to polymer ratio was decreased which resulted in a lower hydrogen flow to the reactor.

Water was injected into the reactor effluent to terminate the polymerization reaction. A stoichiometric amount of water to the sum total of the 3 catalyst components is sufficient to neutralize the catalyst and terminate activity but a molar excess of 20% or greater was used to ensure complete hydrolysis and deactivation of the catalyst.

Antioxidant was injected into the reactor effluent to protect the polymer from oxidation in the devolatilization portion of the plant as well as during storage and subsequent processing at the converter's facility. The antioxidant package for each run was mixed with solvent in a mechanically agitated vessel. An industry standard positive displacement pump was used to provide the supply pressure to inject the slurry package into the reactor effluent. The flow was metered, using coriolis technology, at a rate that produces the antioxidant concentrations in the polymer as noted in the table below.

After terminating the reaction and adding the protective antioxidant package, the steam flowed through a heat exchanger to increase the stream temperature in preparation for polymer separation. A rising stem plug valve, located downstream of the heat exchanger was automatically manipulated (by the DCS) to control the liquid full reactor system pressure at the value noted in the table below. After passing through the reactor pressure control valve, the solvent and unreacted ethylene, 1-octene, and hydrogen were separated from the polymer using standard solution polymerization devolatilization/separation technology.

After separating the volatile components from the non-volatile ethylene-1-octene copolymer in the devolatilization system, the mass flow of said stream was measured using standard coriolis meter technology. Conventional gas chromatography technology was used to measure the polymer-free stream composition. This stream information was used with the feed flow information to calculate the conversion of ethylene and 1-octene as shown in following equations:

$$\text{Ethylene Conversion} = \qquad (16)$$
$$100 * \frac{(\text{Ethylene Flow to Reactor} - \text{Ethylene Flow Exiting Reactor})}{\text{Ethylene Flow to Reactor}}$$

$$1 - \text{Octene Conversion} = \qquad (17)$$
$$100 * \frac{(\text{Octene Flow to Reactor} - \text{Octene Flow Exiting Reactor})}{\text{Octene Flow to Reactor}}$$

ASTM D4703 was used to make a polymer plaque for density analysis. ASTM D792 was used to measure the density of each polymer sample noted in the table below. ASTM D1238 was used to measure the polymer melt index and melt flow ratio ($I_{10}/I_2$). The $1^{st}$ Reactor and $2^{nd}$ Reactor density and melt index values are model estimates. The overall density, melt index, and melt flow ratio are measured values of the bimodal polymer.

TABLE 1

Reaction Conditions to Produce Polyethylene Composition 1.

| Parameter | Units | $1^{st}$ Reactor | $2^{nd}$ Reactor | Overall |
|---|---|---|---|---|
| Feed Temperature | ° C. | 10 | 35 | |
| Isopar E/Polymer | lbs/lbs | 5.6 | 2.8 | |
| Isopar E/Ethylene | lbs/lbs | 5.5 | 2.8 | |
| 1-Octene/Ethylene | lbs/lbs | 0.39 | | |
| Hydrogen/Polymer | grams/tonne | 403 | 1,152 | |
| Reactor Temperature | ° C. | 180 | 195 | |
| Reactor Pressure | psig | 575 | 575 | |
| Catalyst Type | — | Catalyst A | Catalyst B | |
| Catalyst Metal | — | Hafnium | Hafnium | |
| Cocatalyst 1 Type | — | Cocatalyst-1 | Cocatalyst-1 | |
| Cocatalyst 2 Type | — | MMAO | MMAO | |
| Ethylene Conversion | wt % | 82.4 | 81.1 | 89.4 |
| 1-Octene Conversion | wt % | 37.2 | 2.1 | 50.6 |
| Solution Viscosity | cP | 2,900 | 1,300 | |
| Polymer Split | wt % | 53 | 47 | 100 |
| Catalyst Efficiency | MMlbs Polymer/lb Hf | 0.5 | 1.7 | 0.8 |
| Cocatalyst 1/Catalyst | moles Cocat 1/mole Hf | 6.0 | 2.5 | |
| Cocatalyst 2/Catalyst | moles Al/mole Hf | 1.4 | 40.0 | |
| Polymer Density | g/cc | 0.8980* | 0.9421* | 0.9180 |
| Polymer Melt Index | dg/min | 0.07* | 2.45* | 0.24 |
| Polymer Melt Flow Ratio | — | | | 8.55 |

TABLE 1-continued

Reaction Conditions to Produce Polyethylene Composition 1.

| Parameter | Units | 1st Reactor | 2nd Reactor | Overall |
|---|---|---|---|---|
| Irgafos 168 in Polymer | ppm$_w$ | | | 1,000 |
| Irganox 1076 in Poly | ppm$_w$ | | | 250 |
| Irganox 1010 in Poly | ppm$_w$ | | | 200 |

Polyethylene Composition 1 was analyzed by iCCD. The data generated from the iCCD testing of Polyethylene Composition 1 is provided in Table 2, which delineates the iCCD data to include the areas of the respective polyethylene fractions (25° C.-35° C., 35° C.-70° C., 70° C.-85° C., and 85° C.-120° C.).

TABLE 2 iCCD of Polyethylene Composition 1.

| | Weight Percent (wt. %) of Temperature Range | Molecular Weight of Temperature Range |
|---|---|---|
| 25° C.-45° C. | 0.46% | 201,556 |
| 45° C.-80° C. | 54.22% | 171,452 |
| 80° C.-95° C. | 5.99% | 126,099 |
| 95° C.-120° C. | 39.33% | 91,208 |

Example 2: Comparative Polyethylene Composition A

Comparative Polyethylene Composition A was a bimodal polyethylene composition generally prepared using the catalyst system and processes provided for preparing the Inventive First Compositions in PCT Publication No. WO 2015/200743.

Example 3: Analysis of Polyethylene Composition 1 and Comparative Composition A

Polyethylene Composition 1 of Example 1 and Comparative Polyethylene Composition A were analyzed by iCCD. The data generated from the iCCD testing of both samples (Polyethylene Composition 1 of Example 1 and Comparative Polyethylene Composition A) are provided in Table 3. Table 3 provides additional data for each sample of Comparative Polyethylene Compositions A and Polyethylene Composition 1 including overall density, melt index, ZSVR, and the ratio of the first fraction molecular weight to the overall molecular weight. These properties were measured based on the test methods described herein.

TABLE 3

Comparison of Polyethylene Composition 1 of Example 1 and Comparative Polyethylene Composition A.

| PE Sample | Polyethylene Composition 1 | Comparative Composition A |
|---|---|---|
| Density (g/cc) | 0.918 | 0.918 |
| Melt Index (g/10 min) | 0.24 | 0.85 |
| ZSVR | 4.5 | 2.1 |
| Mw/Mn | 2.34 | 3.69 |
| Overall Mw (g/mol) | 137,300 | 119,300 |
| 45° C.-80° C. fraction area | 54% | 53% |
| 80° C.-95° C. fraction area | 6% | 30% |
| 95° C.-120° C. fraction area | 39% | 17% |
| 45° C.-80° C. Mw | 171,452 | 154,889 |
| 80° C.-95° C. Mw | 126,099 | 62,885 |
| 95° C.-120° C. Mw | 91,208 | 109,822 |
| Ratio of 45° C.-80° C. fraction area/ 80° C.-95° C. fraction area | 9.05 | 1.79 |
| Ratio of Mwt. of 45° C.-80° C. fraction/ Mwt. of 80° C.-95° C. | 1.36 | 2.46 |
| Ratio of 45° C.-80° C. fraction/Overall Mwt. | 1.25 | 1.30 |

Example 4: Preparation of Comparative Films A-F and Film 1

Table 4 identifies the commercially-available polyethylene compositions of Comparative Polyethylene Compositions B-E.

TABLE 4

Comparative Polyethylene Compositions used in Comparative Films A-F.

| Comparative Polyethylene Composition | Commercial Name (Company of Manufacture) | Density (g/cc) | Melt Index (g/10 min) | Mw/Mn |
|---|---|---|---|---|
| B | AFFINITY ™ 8100G (The Dow Chemical Co.) | 0.870 | 1.0 | 2.1 |
| C | ENGAGE ™ 7387 (The Dow Chemical Co.) | 0.870 | <0.5 | 2.3 |
| D | SUPERTOUGH 22ST05 (Total S.A.) | 0.921 | 0.5 | 4.2 |
| E | 80% DOWLEX ™ GM 8090 (The Dow Chemical Co.) | 0.916 | 1.0 | |

In this Example, one film, including the Polyethylene Composition 1, and six comparative films were prepared, each having an overall thickness of 70 μm. Layer A of each film was 20% of the thickness of the overall film, each Layer B was 60% of the thickness of the overall film, and each Layer C was 20% of the thickness of the overall film. The materials to produce each of the film samples of Example 4 are provided in Table 5, and the extrusion conditions used to produce Comparative Films A-F and Film 1 are summarized in Table 6.

TABLE 5

Layer distribution and composition of Film 1 and Comparative Films A-F.

|  | Layer A (20%) | Layer B (60%) | Layer C (20%) |
|---|---|---|---|
| Film 1 | DOWLEX ™ GM 8090 | Polyethylene Composition 1 | DOWLEX ™ GM 8090 |
| Film A | DOWLEX ™ GM 8090 | AFFINITY ™ 8100G | DOWLEX ™ GM 8090 |
| Film B | DOWLEX ™ GM 8090 | ENGAGE ™ 7387 | DOWLEX ™ GM 8090 |
| Film C | DOWLEX ™ GM 8090 | 20% ENGAGE ™ 7387 + 80% DOWLEX ™ GM 8090 | DOWLEX ™ GM 8090 |
| Film D | DOWLEX ™ GM 8090 | SUPERTOUGH 22ST05 | DOWLEX ™ GM 8090 |
| Film E | DOWLEX ™ GM 8090 | Comparative Polyethylene Composition A | DOWLEX ™ GM 8090 |
| Film F | DOWLEX ™ GM 8090 | 20% AFFINITY ™ 8100G + 80% DOWLEX ™ GM 8090 | DOWLEX ™ GM 8090 |

TABLE 6

Extrusion conditions for Film 1 and Comparative Films A-F.

|  | Unit | A | B | C | D | E | F | 1 |
|---|---|---|---|---|---|---|---|---|
| Thickness | (μm) | 70 | 70 | 70 | 70 | 70 | 70 | 70 |
| B.U.R. |  | 2.5:1 | 2.5:1 | 2.5:1 | 2.5:1 | 2.5:1 | 2.5:1 | 2.5:1 |
| Corona treated | (dyne) | 42 | 42 | 42 | 42 | 42 | 42 | 42 |
| Die gap | (mm) | 2.5 | 2.5 | 2.5 | 2.5 | 2.5 | 2.5 | 2.5 |
| Layer percentage Extr. A | (%) | 20 | 20 | 20 | 20 | 20 | 20 | 20 |
| Layer percentage Extr. B | (%) | 60 | 60 | 60 | 60 | 60 | 60 | 60 |
| Layer percentage Extr. C | (%) | 20 | 20 | 20 | 20 | 20 | 20 | 20 |
| Melt Pressure Extr. A | (bar) | 269 | 257 | 257 | 262 | 262 | 257 | 262 |
| Melt Pressure Extr. B | (bar) | 349 | 556 | 430 | 421 | 379 | 356 | 562 |
| Melt Pressure Extr. C | (bar) | 283 | 266 | 262 | 270 | 270 | 266 | 215 |
| Melt Temperature Extr. A | (° C.) | 226 | 225 | 221 | 223 | 224 | 225 | 215 |
| Melt Temperature Extr. B | (° C.) | 231 | 238 | 233 | 228 | 229 | 240 | 242 |
| Melt Temperature Extr. C | (° C.) | 230 | 229 | 236 | 230 | 230 | 236 | 236 |
| Output Rate | (kg/h) | 130 | 130 | 130 | 130 | 130 | 130 | 120 |
| Screw Speed Extr. A | (rpm) | 50 | 51 | 50 | 48 | 50 | 50 | 44 |
| Screw Speed Extr. B | (rpm) | 57 | 63 | 56 | 59 | 56 | 54 | 58 |
| Screw Speed Extr. C | (rpm) | 43 | 43 | 42 | 40 | 41 | 41 | 43 |
| Take-off Speed | (m/min) | 22.4 | 22.4 | 22 | 22.1 | 22.1 | 22 | 19.9 |

Example 5: Analysis of Comparative Films A-F and Film 1

To compare the performance of Film 1 and Comparative Films A-F, puncture force, puncture resistance, puncture elongation, puncture energy, dart drop impact, Average Elmendorf CD Tear, and Average Elmendorf MD Tear were measured according to the test methods described hereinabove. The puncture and dart drop impact results for Film 1 and Comparative Films A-F are provided in Table 7.

TABLE 7

Puncture and Dart Drop Impact measurements of Film 1 and Comparative Films A-F.

|  | Puncture Force (N) | Puncture Resistance (J/cm³) | Puncture Elongation (mm) | Puncture Energy (J) | Dart Drop Impact (g) | CD Tear (g) | MD Tear (g) |
|---|---|---|---|---|---|---|---|
| Film 1 | 103.6 | 13.11 | 117.4 | 7.289 | 1150 | 1125 | 569.9 |
| Film A | 50.47 | 6.640 | 116.3 | 3.715 | 781 | 852.7 | 464.4 |
| Film B | 58.70 | 9.043 | 138.6 | 5.021 | 725 | 447.7 | 178.4 |
| Film C | 67.53 | 7.658 | 100.8 | 4.373 | 524 | 994.1 | 565.7 |

TABLE 7-continued

Puncture and Dart Drop Impact measurements of Film 1 and Comparative Films A-F.

| | Puncture Force (N) | Puncture Resistance (J/cm$^3$) | Puncture Elongation (mm) | Puncture Energy (J) | Dart Drop Impact (g) | CD Tear (g) | MD Tear (g) |
|---|---|---|---|---|---|---|---|
| Film D | 74.87 | 7.394 | 88.83 | 4.314 | 385 | 1140 | 573.7 |
| Film E | 65.56 | 5.691 | 79.05 | 3.334 | 781 | 1306 | 732.3 |
| Film F | 56.42 | 6.610 | 97.94 | 3.606 | 515 | 985 | 561.1 |

As shown in Table 7, Film 1, exhibited puncture properties (puncture force, puncture resistance, puncture elongation, and puncture energy higher than all of the other comparative film samples A-F. For Films D and E, which utilized comparative polyethylene compositions having densities closest to the presently-disclosed polyethylene compositions, Film 1 exhibited superior puncture properties as well as dart drop impact (Method B).

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A polyethylene composition comprising:
a first polyethylene fraction area in the temperature range from 45° C. to 80° C. of an elution profile via improved comonomer composition distribution (iCCD) analysis method;
a second polyethylene fraction area in the temperature range from 80° C. to 95° C. of the elution profile via iCCD analysis method, wherein the second polyethylene fraction area comprises at least 5% of the total area of the elution profile;
a third polyethylene fraction area in the temperature range from 95° C. to 120° C. of the elution profile via iCCD analysis method, wherein the third polyethylene fraction area comprises at least 25% of the total area of the elution profile;
wherein:
a ratio of the first polyethylene fraction area to the second polyethylene fraction area is from 6 to 15; and
the polyethylene composition has a density of 0.910 g/cm$^3$ to 0.924 g/cm$^3$ and a melt index (I$_2$) of 0.1 g/10 minutes to 0.5 g/10 minutes.

2. The polyethylene composition of claim 1, wherein the polyethylene composition has a molecular weight distribution, expressed as the ratio of the weight average molecular weight to number average molecular weight (Mw/Mn), in the range of from 2.0 to 5.0.

3. The polyethylene composition of claim 1, wherein the polyethylene composition has a zero shear viscosity ratio of from 3 to 6.

4. The polyethylene composition of claim 1, wherein a ratio of a molecular weight the first polyethylene fraction to a molecular weight of the second polyethylene fraction is from 0.75 to 1.50.

5. The polyethylene composition of claim 1, wherein the third polyethylene fraction comprises a peak, and the width of the peak at 50 percent peak height is from 2° C. to 10° C.

6. The polyethylene composition of claim 1, wherein the first polyethylene fraction area comprises from 45% to 60% of the total area of the elution profile.

7. The polyethylene composition of claim 1, wherein the second polyethylene fraction area comprises from 5% to 15% of the total area of the elution profile.

8. The polyethylene composition of claim 1, wherein the third polyethylene fraction area comprises from 25% to 50% of the total area of the elution profile.

9. The polyethylene composition of claim 1, wherein the polyethylene composition has tan delta ratio of from 2.0 to 5.0, when measured using the DMS frequency swap test methods at 0.1 rad/see per 500 rad/sec.

10. The polyethylene composition of claim 1, wherein the polyethylene composition has tan delta of from 1.0 to 6.0, when measured using the DMS frequency swap test methods at 0.1 rad/see and 190° C.

11. A polyethylene composition comprising:
a first polyethylene fraction area in the temperature range from 45° C. to 80° C. of an elution profile via improved comonomer composition distribution (iCCD) analysis method;
a second polyethylene fraction area in the temperature range from 80° C. to 95° C. of the elution profile via iCCD analysis method, wherein the second polyethylene fraction area comprises at least 5% of the total area of the elution profile;
a third polyethylene fraction area in the temperature range from 95° C. to 120° C. of the elution profile via iCCD analysis method, wherein the third polyethylene fraction area comprises at least 25% of the total area of the elution profile; and
wherein the polyethylene composition has a density of 0.910 g/cm$^3$ to 0.924 g/cm$^3$, a melt index (I$_2$) of 0.1 g/10 minutes to 0.5 g/10 minutes, and a molecular weight distribution, expressed as the ratio of the weight average molecular weight to number average molecular weight (Mw/Mn), in the range of from 2.0 to 5.0.

12. A film comprising the polyethylene composition of claim 1.

13. The film of claim 12, wherein the film is a monolayer film.

14. The film of claim 12, wherein the film is a multilayer film.

15. The film of claim 14, wherein one or more layers of the multilayer film comprises the polyethylene composition.

16. A film comprising the polyethylene composition of claim 11.

17. The film of claim 16, wherein the film is a monolayer film.

18. The film of claim 16, wherein the film is a multilayer film.

19. The film of claim 18, wherein one or more layers of the multilayer film comprises the polyethylene composition.

* * * * *